(12) United States Patent
Touboul

(10) Patent No.: US 10,341,456 B2
(45) Date of Patent: *Jul. 2, 2019

(54) CACHING STICKER PROFILES WITHIN A STICKER COMMUNICATION SYSTEM

(71) Applicants: Shlomo Touboul, Kfar Chaim (IL); Marc Berger, Rehovot (IL)

(72) Inventor: Shlomo Touboul, Kfar Chaim (IL)

(73) Assignees: Marc Berger, Rehovot (IL); Shlomo Touboul, Kfar Chaim (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/112,723

(22) Filed: Aug. 26, 2018

(65) Prior Publication Data

US 2019/0158618 A1    May 23, 2019

Related U.S. Application Data

(63) Continuation-in-part of application No. 15/817,501, filed on Nov. 20, 2017, now Pat. No. 10,063,639.

(51) Int. Cl.
*H04W 4/80* (2018.01)
*H04L 29/08* (2006.01)

(52) U.S. Cl.
CPC .......... *H04L 67/2842* (2013.01); *H04L 67/10* (2013.01); *H04L 67/12* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 9,451,573 B2 * | 9/2016 | Erickson | H04W 76/10 |
| 9,629,193 B2 * | 4/2017 | Erickson | H04W 76/10 |
| 9,634,928 B2 * | 4/2017 | Choudhury | H04L 45/42 |
| 9,712,963 B2 * | 7/2017 | Kim | H04W 4/023 |
| 2016/0094398 A1 * | 3/2016 | Choudhury | H04L 45/42 370/254 |
| 2018/0001184 A1 * | 1/2018 | Tran | H04N 5/2257 |
| 2018/0146058 A1 * | 5/2018 | Somayazulu | H04L 43/16 |

* cited by examiner

*Primary Examiner* — Fayyaz Alam
(74) *Attorney, Agent, or Firm* — Marc A. Berger

(57) ABSTRACT

A sticker communication system with multi-level caching, including a plurality of stickers, each sticker having a unique ID, each sticker attachable to an item of goods having a unique ID, and each sticker including a processor, a cache caching sticker profiles for a plurality of stickers, wherein a sticker profile includes a sticker ID, an ID for an item of goods to which the sticker is attached, and one or more data entities in the form of [attribute name|attribute value|timestamp, and a wireless communicator, wirelessly transmitting and receiving sticker profiles, wherein the processor is configured to transmit sticker profiles stored in the cache via the wireless communicator to currently nearby stickers that are within range of the wireless communicator, to receive sticker profiles from the nearby stickers, and to store the received sticker profiles in the cache.

9 Claims, 25 Drawing Sheets

| STICKER ID | ITEM ID | ATTRIBUTE NAME | ATTRIBUTE VALUE | TIMESTAMP |
|---|---|---|---|---|
| | | ATTRIBUTE NAME | ATTRIBUTE VALUE | TIMESTAMP |
| | | ATTRIBUTE NAME | ATTRIBUTE VALUE | TIMESTAMP |
| | | ATTRIBUTE NAME | ATTRIBUTE VALUE | TIMESTAMP |
| | | ATTRIBUTE NAME | ATTRIBUTE VALUE | TIMESTAMP |
| | | ATTRIBUTE NAME | ATTRIBUTE VALUE | TIMESTAMP |

FIG. 18

CACHING STICKER PROFILES WITHIN A STICKER COMMUNICATION SYSTEM

CROSS REFERENCE TO RELATED APPLICATIONS

This application is a continuation-in-part of U.S. patent application Ser. No. 15/817,501 entitled STICKER COMMUNICATION METHOD AND SYSTEM, and filed on Nov. 20, 2017 by inventor Shlomo Touboul.

FIELD OF THE INVENTION

The present invention relates to a world-wide network of stickers and other Internet of Things (IoT) devices, and specifically to caching of sticker profiles.

BACKGROUND OF THE INVENTION

The relevant background relates to IoT devices and to iBeacons.

The IoT is a network of physical devices, vehicles, home appliances, and other items embedded with electronics, software, sensors, actuators, and network connectivity which enable these objects to collect and exchange data. Each thing is uniquely identifiable through its embedded computing system but is able to interoperate within the existing Internet infrastructure. The IoT allows objects to be sensed or controlled remotely across existing network infrastructure, creating opportunities for more direct integration of the physical world into computer-based systems, and resulting in improved efficiency, accuracy and economic benefit in addition to reduced human intervention. "Things", in the IoT sense, can refer to a wide variety of devices such as heart monitoring implants, biochip transponders on farm animals, cameras streaming live feeds of wild animals in coastal waters, automobiles with built-in sensors, DNA analysis devices for environmental/food/pathogen monitoring, or field operation devices that assist firefighters in search and rescue operations. These devices collect useful data with the help of various existing technologies and then autonomously flow the data between other devices. The quick expansion of Internet-connected objects is expected to generate large amounts of data from diverse locations, with the consequent necessity for quick aggregation of the data, and an increase in the need to index, store, and process such data more effectively. (Source: Wikipedia, https://en.wikipedia.org/wiki/Internet of things).

iBeacon is a protocol developed by Apple. Various vendors have made iBeacon-compatible hardware transmitters—typically called beacons—a class of Bluetooth low energy devices that broadcast their identifier to nearby portable electronic devices. The technology enables smartphones, tablets and other devices to perform actions when in close proximity to an iBeacon. iBeacon is based on Bluetooth low energy proximity sensing by transmitting a universally unique identifier picked up by a compatible application or operating system. The identifier and several bytes sent with it can be used to determine the device's physical location, track customers, or trigger a location-based action on the device such as a check-in on social media or a push notification. iBeacon can also be used with an application such as an indoor positioning system, which helps smartphones determine their approximate location or context. With the help of an iBeacon, a smartphone's software can approximately find its location relative to an iBeacon in a store. Brick and mortar retail stores use the beacons for mobile commerce, offering customers special deals through mobile marketing, and enable mobile payments through point of sale systems. Applications that can be deployed using beacons include distributing messages at a specific point of interest, for example a store, a bus stop, a room or a more specific location like a piece of furniture or a vending machine. iBeacon differs from other location-based technologies as the broadcasting device (beacon) is only a 1-way transmitter to the receiving smartphone or receiving device, and necessitates a specific application installed on the device to interact with the beacons. This ensures that only the installed application, not the iBeacon transmitter, can track users as they passively walk around the transmitters. iBeacon compatible transmitters come in a variety of form factors, including small coin cell devices, USB sticks, and generic Bluetooth 4.0 capable USB dongles. (Source: Wikipedia, https://en.wikipedia.org/wiki/IBeacon)

Conventional IoT requires devices to communicate via the Internet. IoT devices are relatively expensive because of their hardware and power. As such, mass production of disposable IoT devices is currently not economical, and certain IoT applications are currently impractical.

SUMMARY

The present invention provides low cost low power Internet of Things (IoT) devices in the form of disposable stickers, which communicate locally with one another over short ranges via a novel world-wide sticker-to-sticker network. The present invention also provides efficient quality control, including environmental and defect control, for items of goods that are moved about.

Specifically, the present invention relates to stickers that are attached to items of goods. The stickers have processors, data storages, and wireless communicators for transmitting and receiving messages. The stickers have power sources that are self-generating or standalone low power supplies. The stickers are on-the-go; the items of goods to which they are attached are moved from place to place, possibly from country to country, by land, by sea or by air, as they are delivered between factories and distribution centers such as supermarkets, pharmacies, hospitals, distributors, resellers, fabrication/assembly and refactoring facilities.

The stickers have interfaces to sensors, which provide information about the stickers, the goods to which the stickers are attached and their vicinities. The stickers have interfaces to drivers, which operate devices coupled with the stickers.

The stickers form a world-wide network, and implement protocols for exchanging messages between nearby stickers that are currently within communication range of one another. Some of the stickers are enhanced, so as to be Internet-enabled for transmitting via the Internet messages originating from stickers and addressed to destination computers, and for receiving via the Internet messages originating from computers and addressed to destination stickers via the Internet. These enhanced stickers serve as endpoints of the sticker-to-sticker network for messages that enter or exit the network.

As such, management and user applications running on computers are able to control operation of the stickers by operating devices coupled to the stickers in response to receiving information from sensors near the stickers, thereby ensuring optimal quality control for the items of goods to which the stickers are attached. The subject invention makes it possible (i) to advantageously avoid spoilage of goods due to environmental conditions, (ii) to recall before use items of goods that are defective, (iii) to identify shortcomings in the ways goods are transported and delivered, (iv) to manage inventory, and (v) to implement vendor-specific functions, such as reading vendor-specific parameters, and activating vendor-specific drivers in response to the parameter readings.

Caching of sticker profiles provides a mechanism for preserving a time history of attributes of goods to which the stickers are attached, for such purposes inter alia as analysis, tracking, and improving performance. Caching enables saving sticker profiles until such time as the profiles are archived or erased.

There is thus provided in accordance with an embodiment of the present invention a sticker communication system with multi-level caching, including a plurality of stickers, each sticker having a unique ID, each sticker attachable to an item of goods having a unique ID, and each sticker including a processor, a cache communicatively coupled with the processor, caching sticker profiles for a plurality of stickers, wherein a sticker profile includes a sticker ID, an ID for an item of goods to which the sticker is attached, and one or more data entities in the form of [attribute name|attribute value|timestamp], and a wireless communicator coupled with the processor and the storage, wirelessly transmitting and receiving sticker profiles, wherein the processor is configured to transmit sticker profiles stored in the cache via the wireless communicator to currently nearby stickers that are within range of the wireless communicator, to receive sticker profiles from the nearby stickers, and to store the received sticker profiles in the cache.

There is additionally provided in accordance with an embodiment of the present invention a method for multi-level caching for use in a sticker communication system, the method including for each one of a plurality of stickers, each sticker having a unique ID and including a cache storing sticker profiles and including a wireless communicator transmitting and receiving sticker profiles, transmitting sticker profiles cached within the sticker's cache to other stickers that are currently nearby to the sticker, within range of the sticker's wireless communicator, wherein a sticker profile includes a unique sticker ID, a unique ID for an item of goods to which the sticker is attached, and one or more data entities in the form of [attribute name|attribute value|timestamp], for each one of the plurality of stickers which is an enhanced sticker, transmitting sticker profiles cached within the sticker's cache to a cloud level cache via an access point for a network, when the access point is currently within range of the enhanced sticker's wireless communicator; and for each cloud level cache, transmitting sticker profiles cached within the cloud level cache to a master cache, wherein each enhanced sticker has a larger cache than that of non-enhanced stickers, thus being able to cache a larger number of sticker profiles than a non-enhanced sticker, wherein each cloud level cache has a larger cache than that of enhanced stickers, thus being able to cache a larger number of sticker profiles than an enhanced sticker, and wherein the master cache has a larger cache than that of the cloud level caches, thus being able to cache a larger number of sticker profiles than a cloud-level cache.

The following definitions are employed throughout the specification.

CONTROL MESSAGE—The term control message as used herein refers generally to an electronic message containing an instruction for a sticker, or an acknowledgement for a sticker.

DATA MESSAGE—The term data message as used herein refers generally to an electronic message containing data regarding properties and/or state of a sticker.

ENHANCED STICKER—The term enhanced sticker as used herein refers generally to a sticker that is capable of transmitting and receiving messages over a wide area network such as the Internet, via network access points.

MANAGEMENT APPLICATION—The term management application as herein refers generally to an application that configures stickers. The management application may receive alerts and generate event logs.

MESSAGE—The term message as used herein includes data messages, control messages and other types of messages.

POLICY—The term policy as used herein refers generally to the manner in which message priority levels are set.

PRIORITY—The term priority as used herein refers generally to the priority of a message, which generally relates to the urgency and/or severity of the message.

PROPERTY—The term property as used herein refers to a physical property in the vicinity of a sticker, or to a data attribute of a sticker.

STATE—The term state as used herein refers to an operational state of a sticker.

STICKER—The term sticker as used herein is intended to include stickers, tags and labels. As such, a sticker is not limited to an adhesive, and is intended to broadly represent something that is affixed to, attached to, clasped to, clipped to, fastened to, glued to, locked onto, screwed onto, taped to, tied to, or mounted on or near an item of goods.

STICKER PROFILE—The term sticker profile as used herein generally refers to a time-based summary of attribute values for an item of goods that a sticker is attached to, in the form of

|Sticker ID|→|Item ID|→{list of attributes}.

USER APPLICATION—The term user application as used herein generally refers to an application that controls functioning of stickers, of stickers' sensors, and of stickers drivers.

BRIEF DESCRIPTION OF THE DRAWINGS

The present invention will be more fully understood and appreciated from the following detailed description, taken in conjunction with the drawings in which:

FIGS. 17-19 are simplified drawings of sticker profiles and their bindings to items, in accordance with an embodiment of the present invention;

TABLE I

Index of elements in the figures

Figure 1:
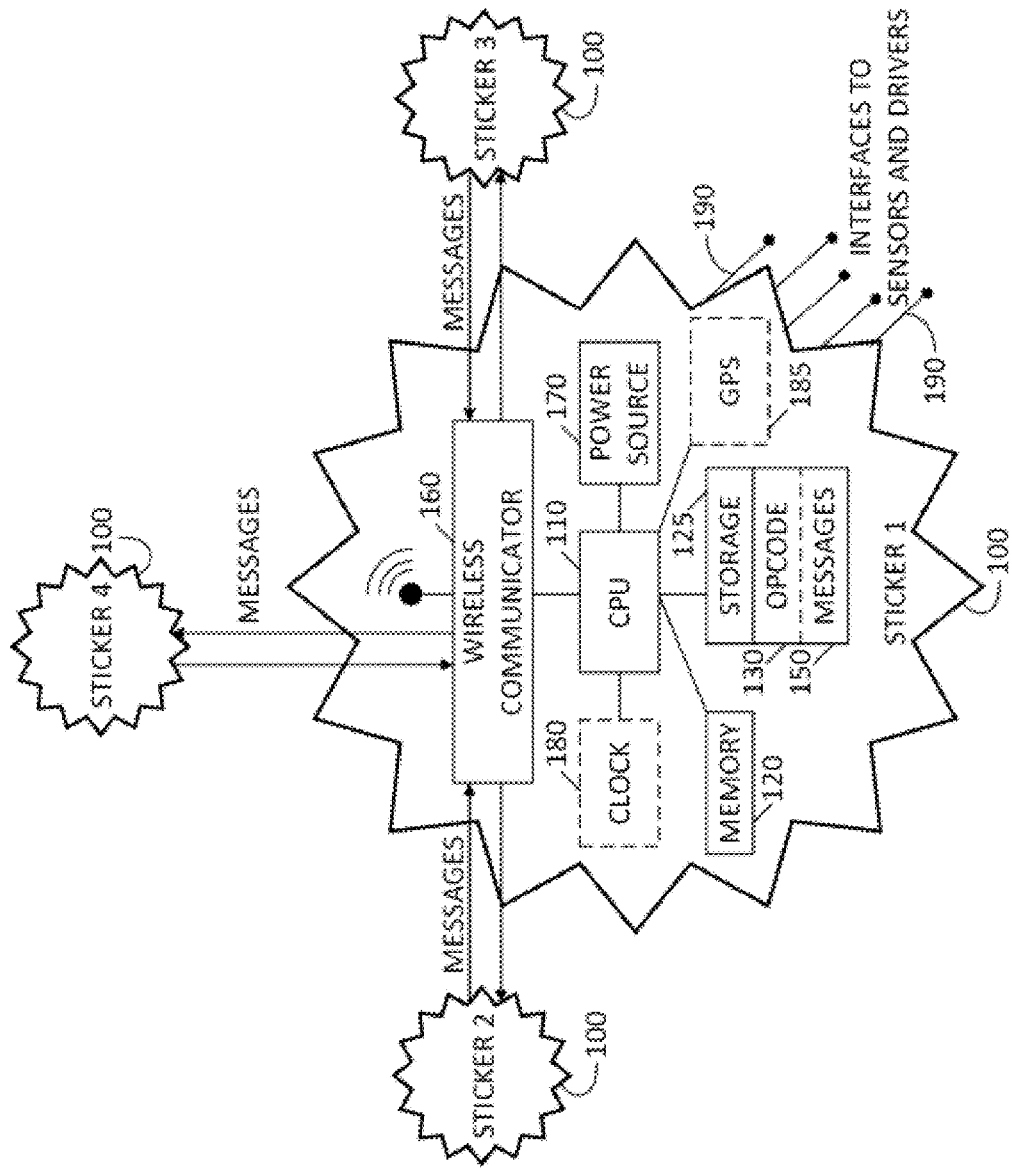
FIG. 1 is a simplified block diagram of a sticker, in accordance with an embodiment of the present invention.

| Element | Description |
|---|---|
| 100 | sticker |
| 101 | enhanced sticker |
| 102-104 | sticker communication ranges |
| 110 | CPU |
| 120 | memory |
| 125 | storage |
| 130 | operation code |

TABLE I-continued

Index of elements in the figures

| Element | Description |
|---|---|
| 131 | application programming interface (API) |
| 132 | messages manager |
| 133 | sensors manager |
| 134 | drivers manager |
| 135 | sticker management client |
| 136 | power manager |
| 137 | message buffers |
| 138 | sticker-to-sticker communication protocol |
| 139 | IP |
| 141 | UDP |
| 142 | small range small packet broadcast |
| 143 | communication interface |
| 144 | sticker-to-Internet communication protocol |
| 150 | messages |
| 151 | header section of message |
| 152 | control section of message |
| 153 | data/instruction section of message |
| 154 | message packet |
| 160 | wireless communicator |
| 170 | power source |
| 180 | clock |
| 185 | GPS |
| 190 | interfaces to sensors and drivers |
| 191 | thermometer |
| 192 | fan driver |
| 193 | vendor-specific sensor |
| 194 | vendor-specific driver |
| 210 | Internet |
| 220 | Internet access point |
| 230 | computer |
| 240 | world-wide network of stickers |
| 250 | sticker management application |
| 260 | sticker user application |
| 270 | API for sticker message; API for sticker sensors and drivers |
| 310 | solar panel |
| 320 | antenna |
| 330 | local charging broadcast |
| 340 | cellular base station |
| 350 | Wi-Fi hotspot |
| 360 | cloud level cache |
| 370 | master cache |

DETAILED DESCRIPTION

Embodiments of the present invention relate to stickers that are attached to items of goods. The items of goods may be containers of consumables such as milk/soft drink bottles, food packages and medicine/chemical containers. The items of goods may be non-consumables such as assembly parts, electronic devices, biological tissues/samples, films, and other goods that benefit from being monitored while in transit.

The stickers have power supplies. The stickers have memories and storages for storing operation code and messages. The stickers are equipped with wireless communicators, and, under control of their operation codes, send messages in an ad-hoc way via a short-range sticker-to-sticker network. Each sticker sends messages to nearby stickers that are within range of its wireless communicator. Stickers may be nearby one another inter alia when the items of goods that they are attached to are on the same delivery truck, on the same shelf in a supermarket, in the same supply room, in the same assembly line or in the same cargo transport. Stickers may be nearby one another irrespective of being attached to items of goods, in order to intermediate by transmitting messages to and receiving messages from other stickers.

The messages transmitted in the sticker-to-sticker network are generally of two kinds; namely, data messages and control messages. Data messages report current properties and operational states of a sticker. Properties of a sticker include physical properties which may include inter alia:
- location of the sticker,
- velocity of the sticker,
- acceleration of the sticker,
- altitude of the sticker,
- temperature at the sticker's location,
- air humidity at the sticker's location,
- air density at the sticker's location,
- vibrations of the sticker,
- battery status of the sticker,
- light intensity at the sticker's location,
- acoustic level at the sticker's location,
- presence of smoke at the sticker's location,
- weight of the item of goods to which the sticker is attached,
- an indicator of whether or not the item of goods was opened, and
- data generated by a custom sensor.

Properties of a sticker also include data attributes, which may include inter alia:
- "ID"—A sticker may have a unique identifier, generally in the form of an address and number,
- "Name"—A sticker may have a name, which is not necessarily unique,
- "Network name"—The network name of a sticker is the name of a private sticker network, or PUBLIC, if the sticker is part of a public sticker network,
- "Authentication"—A sticker that participates in a private sticker network may have authentication data,
- "Power level"—an indication of the power level of a sticker,
- "Health"—The health of a sticker is the result of self-diagnostic testing of the sticker, its sensors and its drivers,
- status/version of the sticker's operation code, and
- error/event logs generated by the sticker's operation code.

The operational states of a sticker may be designated by text or binary code. States may include inter alia:
- "Standalone state"—A sticker in the standalone state is located randomly, such as on a shelf, or somewhere near items of goods, but not attached to an item of goods. A standalone sticker participates in a sticker network, and transmits and receives messages from other stickers. E.g., standalone stickers may be placed between a supply area with items of goods that have stickers attached, and an enhanced sticker near an Internet gateway, in order to enable communication between the enhanced sticker and the stickers that are attached to the items of goods. The standalone sticker may be attached to a wall or to a door at a location between the supply area and the Internet gateway.
- "Attached state"—A sticker in the attached state is attached to an item of goods. Generally a sticker in the attached state operates active sensors and drivers.
- "Non-configured state"—A sticker in the non-configured state is a new sticker that has not yet been configured to a specific user application. A sticker in the non-configured state does not communicate with a management application or a user application. A sticker in the non-configured state may nevertheless act as a standalone sticker and transmit and receive messages in a public sticker network.

A data message may include a priority, which generally reflects the severity of the data.

Control messages include instructions or acknowledgements for stickers. The instructions may request that stickers perform specific actions, including inter alia:
- activating an LED or such other display,
- activating a sensor coupled with the sticker,
- updating the sticker's operation code;
- updating vendor-specific code;
- configuring itself, and
- resetting itself.

A control message with an instruction may include a priority, which generally reflects the urgency of carrying out the instruction.

The acknowledgements confirm that messages were received by their intended destinations, in response to which the stickers clear the acknowledged messages from their storages.

At least some of the stickers are further enabled to transmit and receive messages over a wide area network such as the Internet, via network access points. These enhanced stickers transmit messages to destination computers on the Internet and receive messages from source computers on the Internet when an Internet access point is within range of their wireless communicators. As such, the enhanced stickers serve as "endpoints", via which messages enter and exit the sticker-to-sticker network.

Reference is made to FIG. 1, which is a simplified block diagram of a sticker 100, in accordance with an embodiment of the present invention. FIG. 1 shows four stickers 100 that exchange messages with one another. Each sticker includes a CPU 110. CPU 110 may be inter alia:
- a system on chip (SoC), and
- a processor and its peripherals.

Each sticker includes a volatile memory 120 and a non-volatile storage 125. Memory 120 and storage 125 are communicatively coupled with CPU 110. Storage 125 stores a unique ID (not shown) for the sticker, operation code 130 and messages 150. Operation code 130 is described below with reference to FIG. 2. Messages 150 include data messages. A data message contains an ID of a source sticker, an address of a destination computer, and data relating to current properties and states of the source sticker. Messages 150 also include control messages. A control message contains an address of a source computer, an ID of a destination sticker, and an instruction or an acknowledgement for the destination sticker. The anatomy of a message is described below with reference to FIG. 3.

Each sticker includes a wireless communicator 160 and a power source 170. Wireless communicator 160 is communicatively coupled with CPU 110, and wirelessly transmits and receives messages from other stickers 100 under instructions of operation code 130. Wireless communicator 160 may be inter alia a communicator for a personal area network. Wireless communicator 160 may be inter alia:
- a Wi-Fi communicator,
- a cellular communicator,
- an infra-red communicator,
- a Bluetooth communicator,
- a Zigbee communicator,
- a Z-wave communicator,
- a wireless USB communicator,
- a radio frequency communicator,
- an infra-red communicator,
- a near-field communicator,
- a low power wide area network (LPWAN) communicator,
- a LoRaWAN communicator,
- a highway addressable remote transducer (HART) communicator, an EnOcean communicator, and a worldwide interoperability for microwave access (Wi-MAX) communicator.

Power source 170 supplies power to CPU 110, to memory 120, to storage 125 and to wireless communicator 160. Power source 170 may be inter alia a battery or a self-generating power source such as:

a solar power source, a miniature chemical reaction source, an RF power source, and a magnetic power source.

When power source 170 is rechargeable, sticker 100 may be charged remotely, as explained below with reference to FIG. 15.

Optionally, sticker 100 includes a clock 180 providing a current date and time, and a GPS 185 providing a current location of sticker 100.

Each sticker includes one or more interfaces 190 to sensors and drivers. The sensors may include sensors for measuring current properties of the sticker and its vicinity, such as:

a motion detector, an accelerometer, a barometer, an altimeter, a thermometer/temperature sensor, an air humidity sensor, an air density sensor, a gaseous sensor, an x-ray sensor, an ultra-violet sensor, an infra-red sensor, a smoke detector, a scale for measuring weight, and a custom sensor.

Data obtained from the sensors is reported in data messages generated by the sticker.

The drivers may include inter alia:

drivers for activating a display device such as an LED, drivers for activating a mechanical or electrical device such as a motor, relays, and programmable logic controllers.

Sticker 100 may optionally include an LED or a display (not shown), which serves as a status indicator.

Generally operation code 130 of sticker 100 causes CPU 110 to transmit messages in storage 125 via wireless communicator 160 to currently nearby stickers that are within range of wireless communicator 160, to receive messages from the nearby stickers, and to store the received messages in storage 125.

If sticker 100 is an enhanced sticker, then generally operation code 130 of sticker 100 further causes CPU 110 to transmit messages in storage 120 to a network, such as the Internet, for forwarding to their respective designated destination computers, when an access point for the Internet is currently within range of wireless communicator 160; and to receive messages, originating from respective computers, via the Internet when an access point for the Internet is currently within range of wireless communicator 160.

Figure 2:
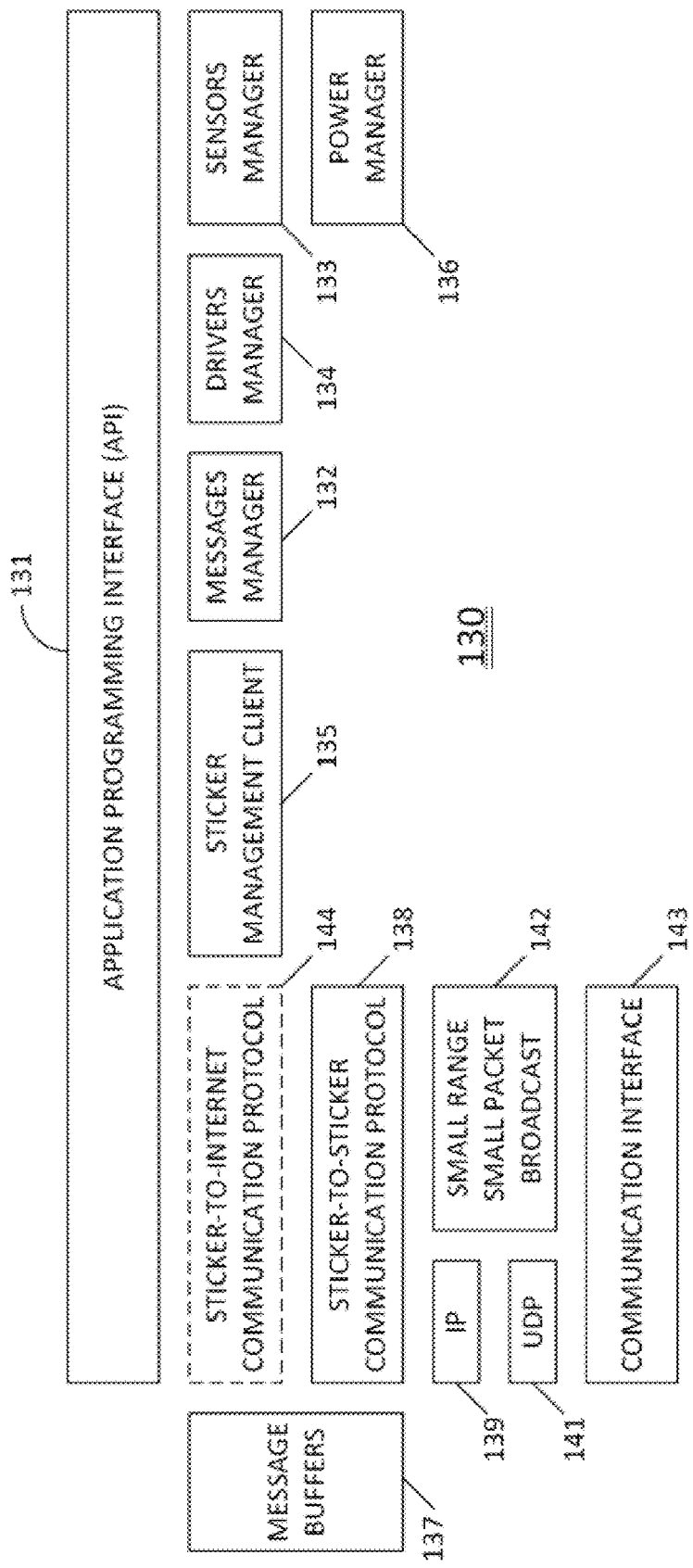
FIG. 2 is a simplified block diagram of operation code of a sticker, in accordance with an embodiment of the present invention.

Reference is made to FIG. 2, which is a simplified block diagram of operation code 130 of a sticker 100, in accordance with an embodiment of the present invention. Shown in FIG. 2 is an application programming interface (API) 131, which enables a developer to build an application that sends and receives messages between the application and sticker 100 via a messages manager 132. API 131 enables a user to extend functionality of sticker 100 by adding new/customized sensors and drivers. The user provides sticker 100 with code to read the new/customized sensor and code to operate the new/customized driver. In an exemplary usage scenario, a user adds a driver to shake a bottle of wine or medicine. This "shaking driver" is controlled by logic that operates a motor. Using API 131, the user application sends the sticker instructions to start and stop shaking the bottle. The instructions may be in the form of a code of "1" to start shaking, and a code of "0" to stop shaking, that is transmitted to a specific port attached to the sticker. API 131 enables transmission of 0s and 1s, and verifies whether or not the instructions were accepted. When the shaking driver is enhanced to include a spinning operation, API 131 enables updating the code of the shaking driver so that it accepts both shake and spin instructions.

Figure 12:
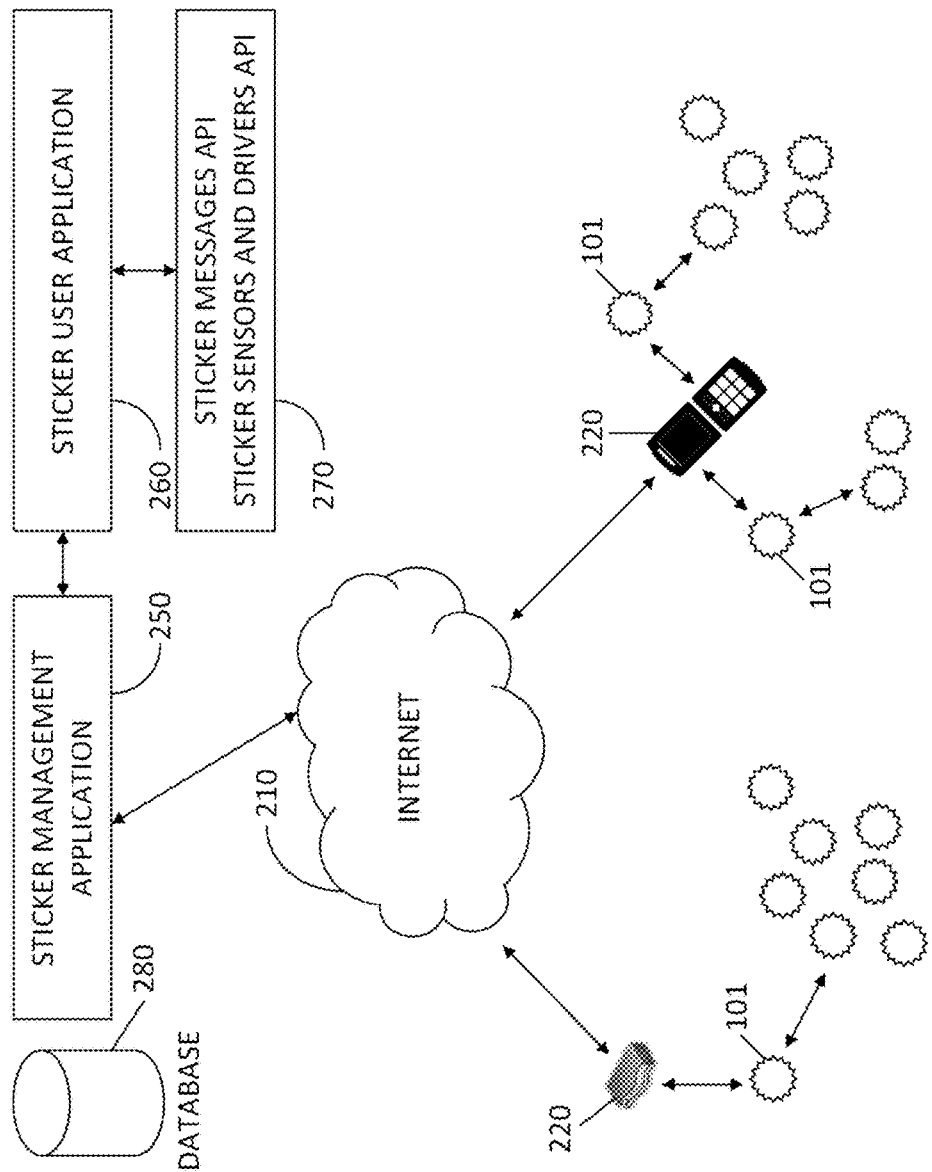
FIG. 12 is a simplified diagram of sticker management, in accordance with an embodiment of the present invention.

Generally, stickers 100 are controlled by (i) a management application (element 250 of FIG. 12), and (ii) a user application (element 260 of FIG. 12). The management application uses a sticker management client 135, and the user application uses API 131 to access sensors and drivers for reading, writing, and executing instructions via a sensors manager 133 and a drivers manager 134.

The management application is generally provided to a user along with the stickers. The management application receives alerts from stickers and from sticker networks, and generates event logs. The management application enables configuring the stickers. Sticker configuration includes inter alia:

configuring if the stickers participate in a global public sticker network, or a private network, private network parameters—name of the private network, sticker name, private network authentication data, configuring sleep time, send and receive intervals, simultaneous vs. serial send and receive, updating sticker operation code 130 and adding code extensions, and managing the power of sticker 100 via a power manager 136.

The management application may provision code extensions to operation code 130 by transmitting sticker machine code that executes on a sticker 100. The sticker machine code is not part of the original operation code 130. The sticker machine code is additional code that is locally or remotely loaded by the management application and API 131, which enables the user to extend the operation of sticker 100 by adding functionality.

The management application may also provision driver code, which is executed by a driver coupled with sticker 100, which enables the user to add functionality to the driver.

The management application designates a policy for data messages and control messages. The policy sets priorities of messages. Generally the priorities reflect the urgencies and/or severities of the messages. In an exemplary usage scenario a policy assigns priority level 5 (highest priority) to data messages reporting temperature readings above a severely high temperature, and assigns a priority level 1 (lower priority) to data messages reporting sticker location data. The policy assigns priority level 5 to control messages with instructions to begin operating a fan, and assigns a priority level 1 to messages with instructions to set an LED light to green.

The sticker network is programmed to move messages with high priority sooner than messages with lower priority. Thus, when a sticker is within range of nearby stickers, it checks the priorities of the messages in its storage. Messages with higher priorities are transmitted before messages with lower priorities, even though the higher priority messages may have arrived after the lower priority messages arrived.

The user application defines and controls functioning of the stickers and of the stickers' sensors and drivers. In an exemplary usage case, stickers are attached to milk bottles in a warehouse. Each sticker has a temperature sensor. Each sticker has a red/green LED. Some stickers are coupled with a cooling fan driver. The user application defines events and responses. A first event may be that the milk is too warm, and the response may be to operate the fan for a designated time interval or until the temperature of the milk drops below a target value. A second event may be that the "use until" date of the milk has passed, and the response may be to turn the sticker LED light to red, and send a control message and/or an e-mail message that the milk has expired.

Operation code 130 also includes message buffers 137 and a sticker-to-sticker protocol 138. Sticker-to-sticker communication is described below with reference to FIG. 3. Operation code 130 also includes an Internet protocol (IP) module 139, a user datagram protocol (UDP) module 141, a small range small packet broadcast module 142 and a communication interface 143. Enhanced stickers 100, which also communicate via the Internet, include a sticker-to-Internet protocol 144.

Figure 3:
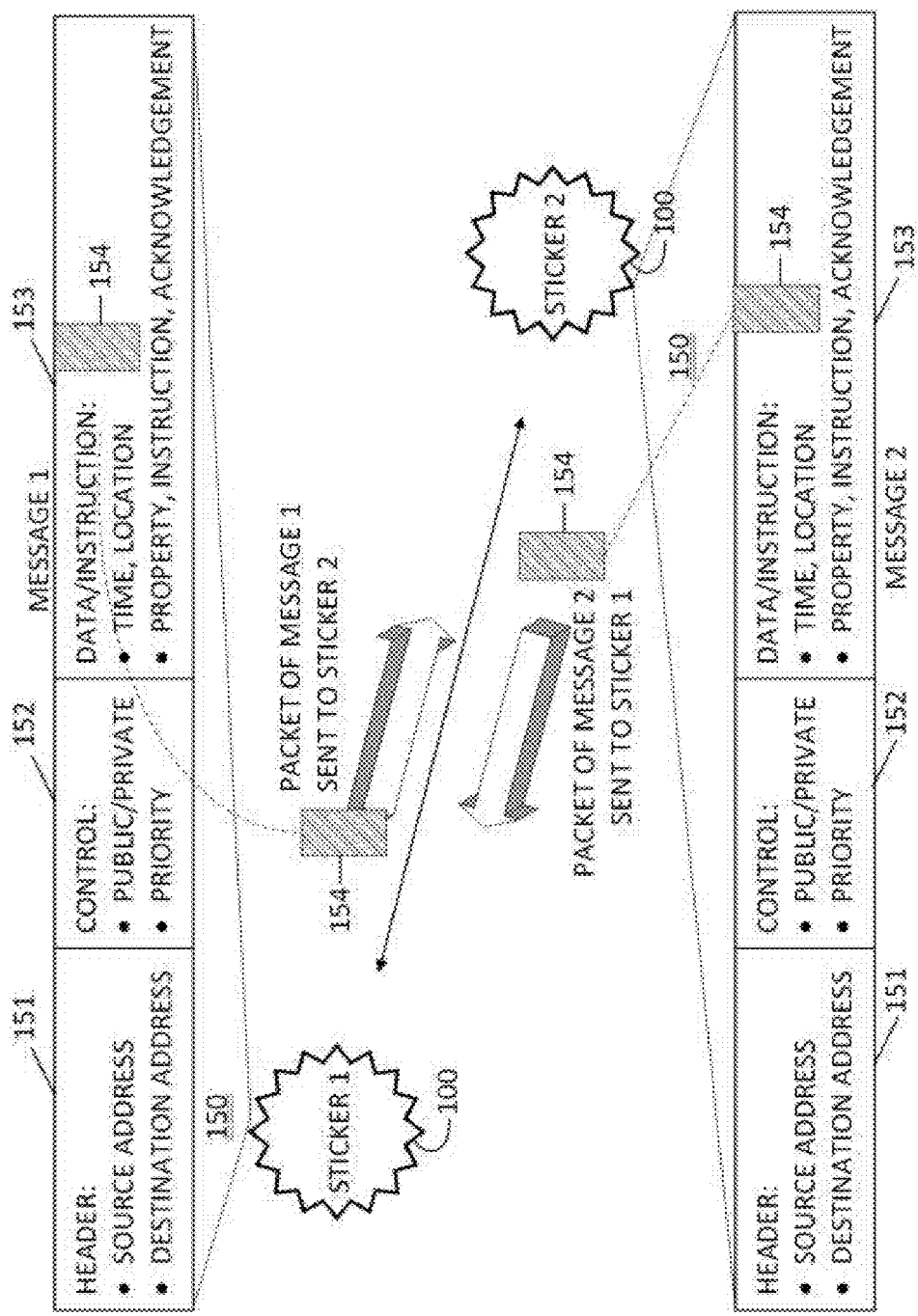
FIG. 3 is a simplified diagram of sticker-to-sticker communication, in accordance with an embodiment of the present invention.

Reference is made to FIG. 3, which is a simplified diagram of sticker-to-sticker communication, in accordance with an embodiment of the present invention. FIG. 3 shows the anatomy of a message 150. Each message 150 includes a header section 151 specifying inter alia a source address and a destination address. Generally, for data messages the source address is a sticker ID, and the destination address is an address of a computer that runs a user application. Generally, for control messages the source address is the address of a computer that runs a user application, and the destination address is an ID of a sticker.

Each message 150 includes a control section 152 designating inter alia a public vs. private network, and a priority.

Each message 150 includes a data/instructions section 153 including inter alia a time and location, current properties of the sticker and its vicinity, one or more instructions for a sticker or for a driver, and one or more acknowledgements for a sticker.

Each message 150 is divided into small packets 154, which are transmitted under control of small range small packet broadcast module 142 (FIG. 2).

FIG. 3 shows two stickers 100; namely, STICKER 1 and STICKER 2, which contain respective messages MESSAGE 1 and MESSAGE 2 in their respective storages 130. When STICKER 1 and STICKER 2 are within communication range of one another, they exchange the messages 150 stored in their respective storages 130. Messages 150 are transmitted one or more packets at a time. FIG. 3 shows a packet 154 of MESSAGE 1 being transmitted from STICKER 1 to STICKER 2, and a packet 154 of MESSAGE 2 being transmitted from STICKER 2 to STICKER 1. It will be appreciated by those skilled in the art that after a sufficient amount of time exchanging packets 154, STICKER 1 and STICKER 2 will each contain the original messages 150 of both stickers.

After each packet of a message is successfully received, the receiving sticker sends an acknowledgement to the transmitting sticker. If the transmitting sticker does not receive an acknowledgement within a designated time period, then it re-transmits the same packet. If the transmitting sticker receives an acknowledgement, then it transmits the next packet of the message to the receiving sticker, until all of the message packets have been acknowledged.

Figure 4:
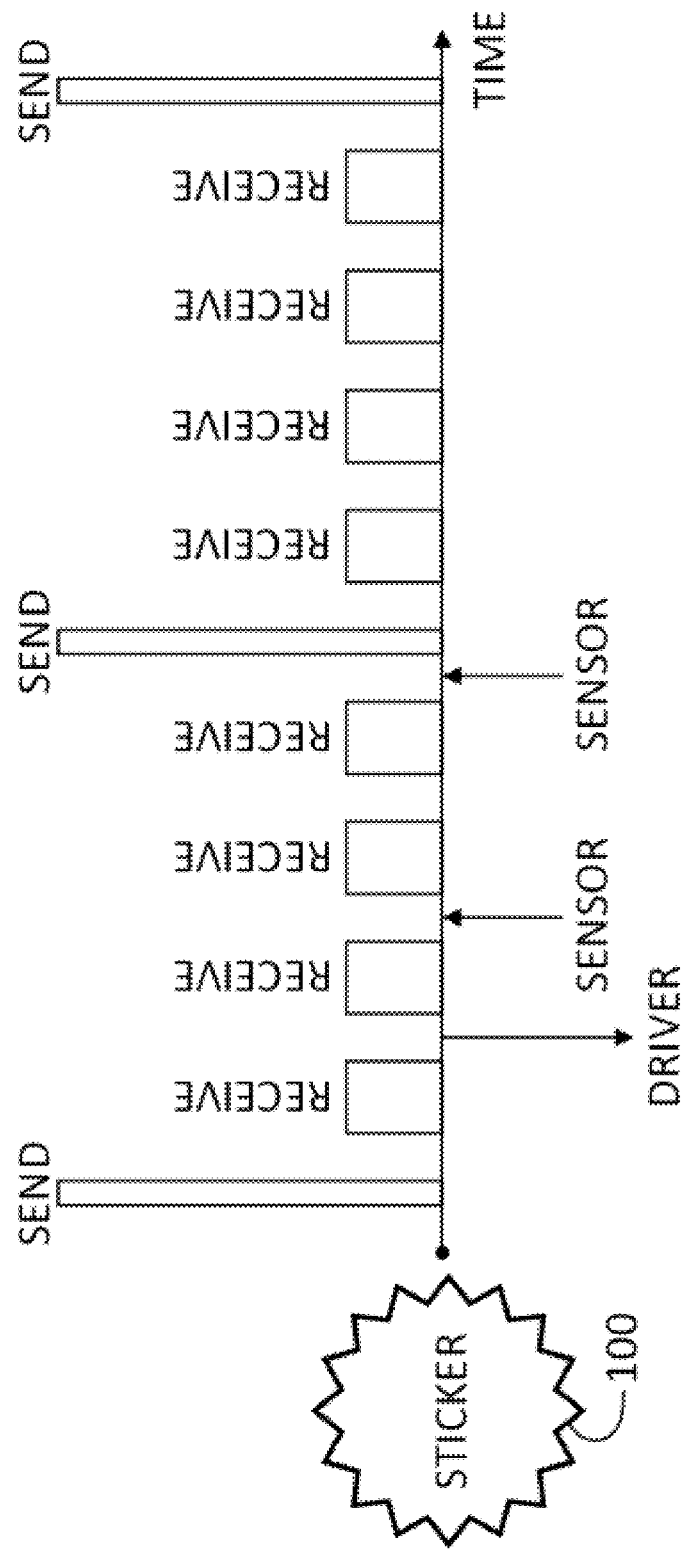
FIG. 4 is a simplified timeline of sticker activity showing regular activity levels, in accordance with an embodiment of the present invention.

Reference is made to FIG. 4, which is a simplified timeline of sticker activity showing regular activity levels, in accordance with an embodiment of the present invention. The timeline includes time intervals for sending messages, and time intervals for receiving messages. The timeline includes times at which sensors are accessed, designated by incoming arrows, and times at which drivers are accessed, indicated by outgoing arrows, by sticker interfaces 190 (FIG. 1).

The send and receive time intervals in FIG. 4 and the sensor and driver interfacing times are set by the management application. The times set by the management application may be self-adaptable by sticker 100, based on proximity of other stickers, priorities of messages, and battery level. Since the send and receive time intervals are repetitive, the likelihood is high that sticker 100 will successfully exchange messages with other stickers that are nearby within range of its wireless communicator 160, as described above with reference to FIG. 3.

During the time that sticker 100 is not occupied with message exchange and with sensor/driver communication, sticker 100 performs computations as necessary, and communicates with its management and/or user application. If an instruction or communication priority is currently high, sticker 100 assigns priority to that instruction or communication, as per the policy designated by the management application.

Figure 5:
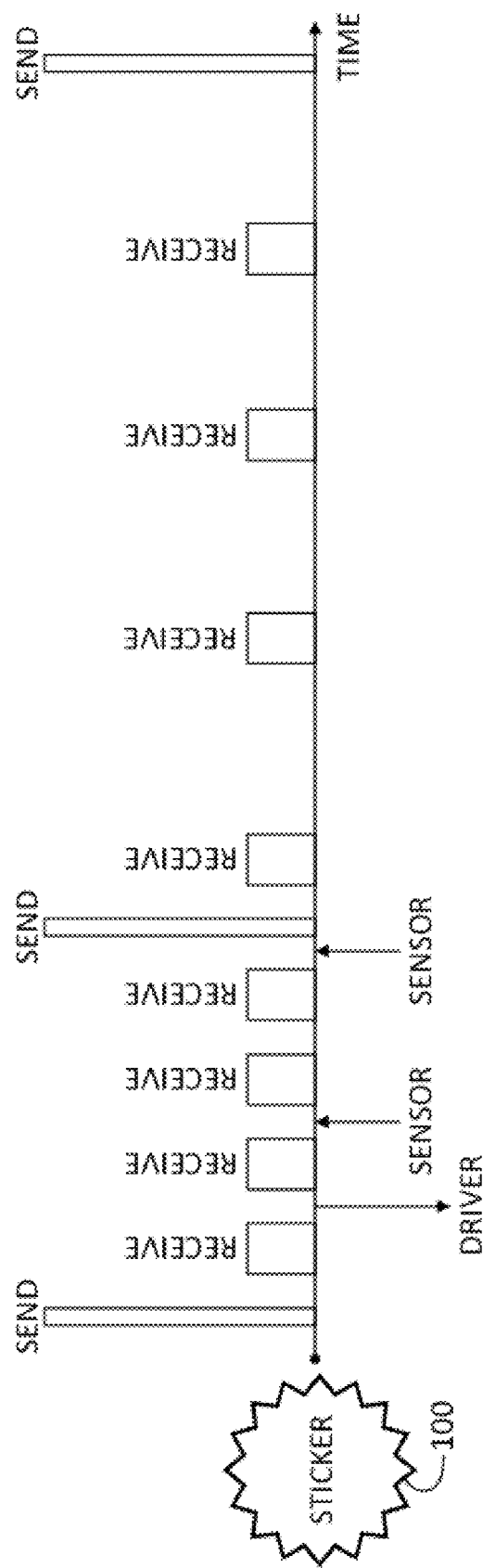
FIG. 5 is a simplified timeline of sticker activity showing high and low activity levels, in accordance with an embodiment of the present invention.

Reference is made to FIG. 5, which is a simplified timeline of sticker activity showing high and low activity levels, in accordance with an embodiment of the present invention. The left side of the timeline shows activity of a sticker when other stickers are nearby, or when the sticker has high priority messages in its storage. The right side of the timeline shows activity of the sticker when other stickers are not nearby, and when the sticker has only low priority messages in its storage.

Figure 6:
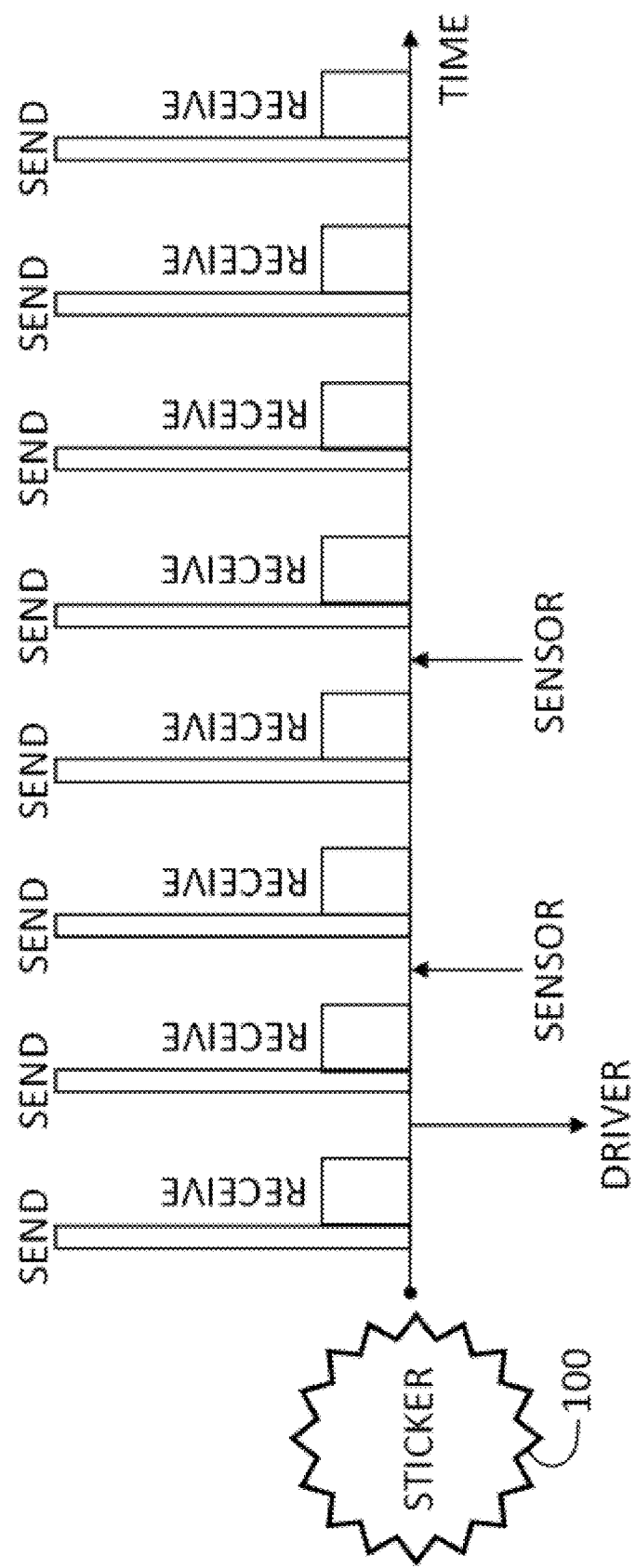
FIG. 6 is a simplified timeline of sticker activity showing simultaneous send and receives, in accordance with an embodiment of the present invention.

Reference is made to FIG. 6, which is a simplified timeline of sticker activity showing simultaneous send and receive, in accordance with an embodiment of the present invention. The timeline shows full duplex send and receive activity. In order for a sticker to be able to operate in full duplex mode, the sticker is equipped with two transmitter/receiver units; namely, one unit that receives data and another unit that simultaneously sends data.

Figure 7:
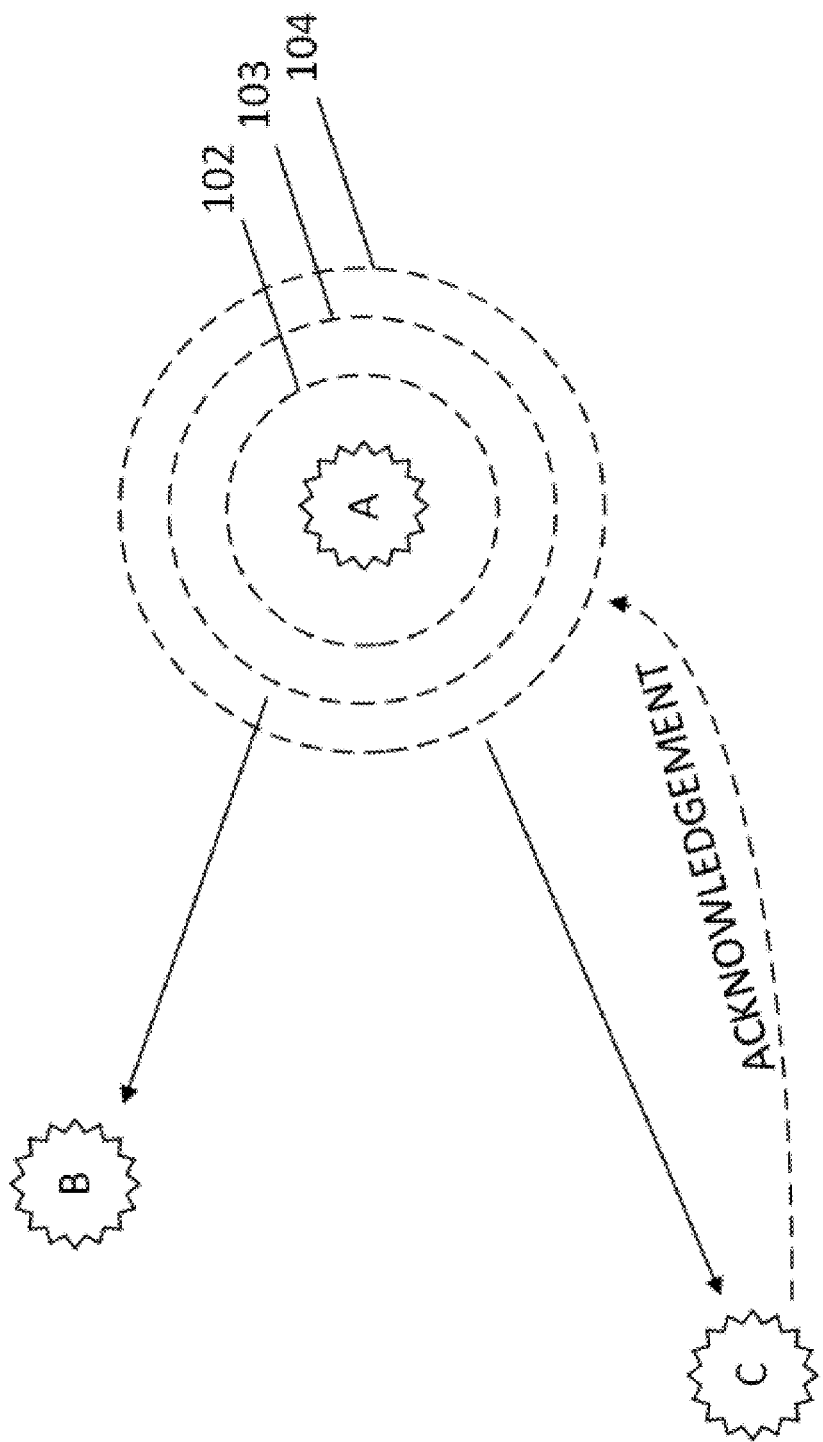
FIG. 7 is a simplified diagram of low power sticker-to-sticker communication, in accordance with an embodiment of the present invention.

Reference is made to FIG. 7, which is a simplified diagram of low power sticker-to-sticker communication, in accordance with an embodiment of the present invention. FIG. 7 shows sticker A with three concentric ranges of communication 102, 103 and 104. Each successive range requires a larger power level than the range within it, albeit the different power levels are all small levels of power; i.e., range 102 corresponds to the lowest of the low power levels, range 103 corresponds to the middle of the low power levels, and range 104 corresponds to the highest of the low power levels. Sticker B is within range 103 of sticker A, and sticker C is within range 104 of sticker A.

In the embodiment of the present invention shown in FIG. 7, each sticker is programmed to use a successively higher power level if it fails to identify other stickers within its range at its current power level, until it reaches the highest of its power levels. The programmed instructions are defined in the sticker's management policy or programmed into the sticker, and generally are dependent upon an interval of time during which the sticker is not in communication with other stickers, the sticker's current power level, and priorities of the sticker's stored messages.

Figure 8:
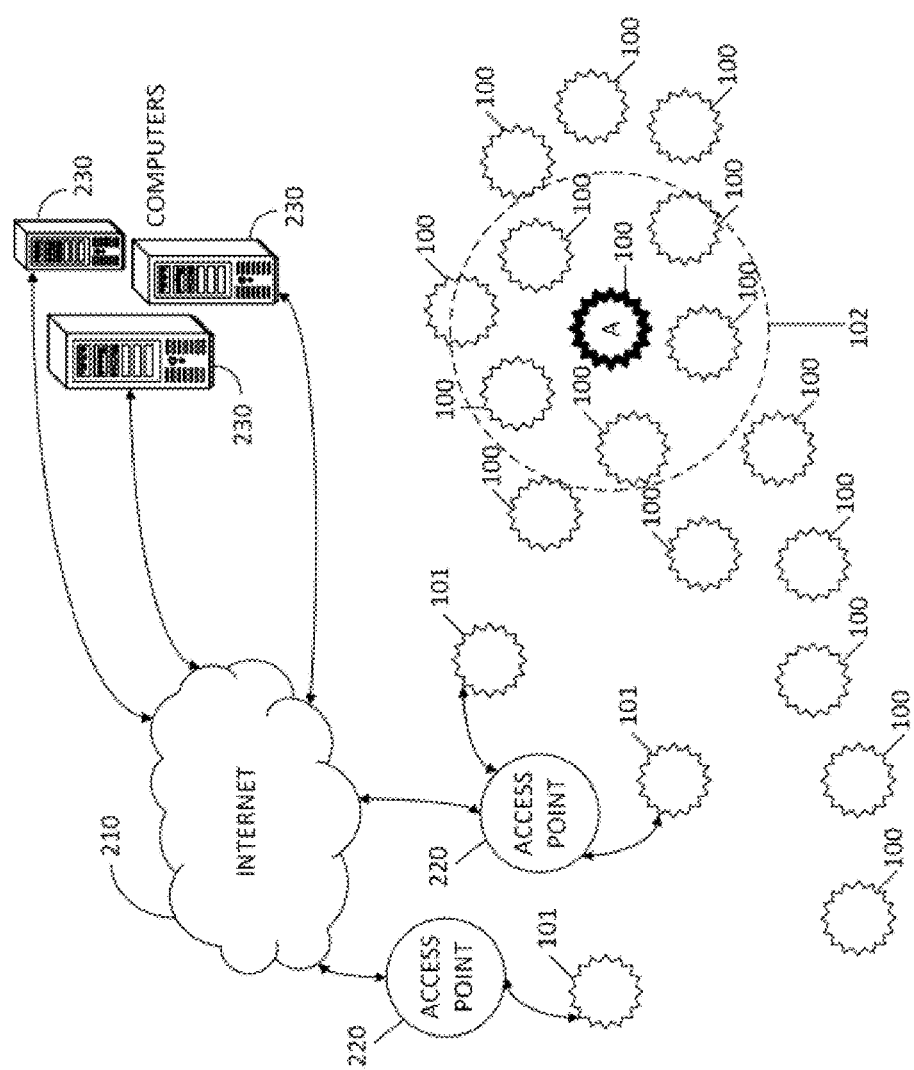
FIG. 8 is a simplified block diagram of a communication system for a network of stickers, in accordance with an embodiment of the present invention.

Reference is made to FIG. 8, which is a simplified block diagram of a communication system for a network of stickers, in accordance with an embodiment of the present invention. FIG. 8 shows a sticker-to-sticker network including stickers 100 and enhanced stickers 101. A dashed circle 102 around one of the stickers, shown in bold and designated A, shows the range of its wireless communicator 160. Stickers 100 located within circle 102 exchange messages with sticker A, as described above with reference to FIG. 3.

FIG. 8 shows the Internet 210, Internet access points 220 and computers 230. Computers 230 are destination computers for data messages, and may be source computers for control messages. When an Internet access point 220 is within communication range of a sticker 101, sticker 101 transmits data messages in its storage 120 via Internet 210 to their respective destination computers 230, and receives control messages addressed to stickers, from source computers 230 via Internet 210. Internet access point 220 may be inter alia at least one of:

a router,
a proxy,
a gateway, and
a cellphone/smartphone.

Figure 9:
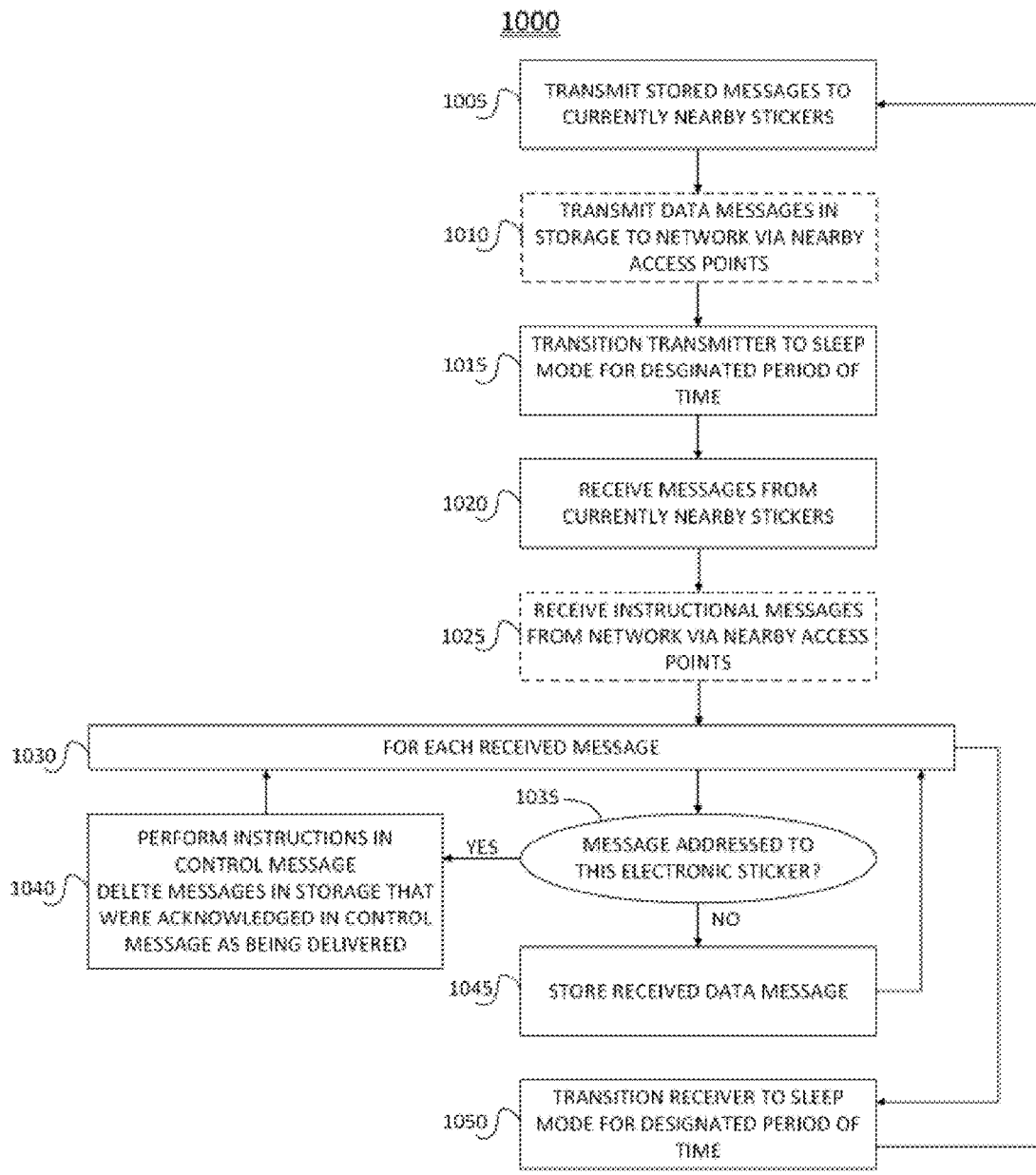
FIG. 9 is a simplified flowchart of a communication method for stickers, in accordance with an embodiment of the present invention.

Reference is made to FIG. 9, which is a simplified flowchart of a communication method 1000 for stickers 100, in accordance with an embodiment of the present invention. Each sticker 100 performs the operations of method 1000, with the exception of operations 1010 and 1025 which are performed by enhanced stickers.

At operation 1005 the sticker's wireless communicator 160 transmits messages stored in the sticker's storage 125 to other stickers that are currently nearby to sticker 100, within range of its wireless communicator 160. If sticker 100 is an enhanced sticker and if an Internet access point is currently within range of its wireless communicator 160, then at operation 1010 the sticker's wireless communicator 160 transmits data messages stored in the sticker's storage 125 to the Internet, for delivery to their destination computers 230, via the Internet access point.

After transmission of messages at operations 1005 and, for an enhanced sticker, at operation 1010, the transmitter of wireless communicator 160 transitions to sleep mode for a first designated period of time, in order to conserve power, at operation 1015. The first designated period of time may be configured during installation of sticker 100, and/or may be set/changed by the management application and/or the user application that control operation of sticker 100.

At operation 1020 sticker 100 receives messages from the other stickers that are within range of wireless communicator 160. If sticker 100 is an enhanced sticker, and if an Internet access point is currently within range of its wireless communicator 160, then at operation 1025 the sticker's wireless communicator 160 receives control messages for destination stickers, via the Internet access point.

Sticker 100 performs a loop 1030 over each message it received at operation 1020 and, for an enhanced sticker, at operation 1025. At operation 1035 sticker 100 determines if the received message is addressed to sticker 100; i.e., if the destination address of the message is the address of sticker 100. If the determination at operation 1035 is affirmative, then the received message is a control message including an instruction and/or an acknowledgement for sticker 100. At operation 1040 sticker 100 performs the instruction in the message, if the message includes an instruction. If the message includes an acknowledgement, then sticker 100 deletes the message(s) in its storage 125 for which successful delivery is acknowledged. Processing then returns to loop 1030.

If the determination at operation 1035 is not affirmative, then at operation 1045 sticker 100 stores the received message in its storage 125. Processing then returns to loop 1030.

After completion of loop 1030, processing advances to operation 1050, at which the receiver of wireless communicator 160 transitions to sleep mode for a second designated period of time, in order to conserve power. The second designated period of time may be configured during installation of sticker 100, and/or may be set/changed by the management and/or the user application that control operation of sticker 100. After operation 1050 processing returns to operation 1005.

Figure 10:
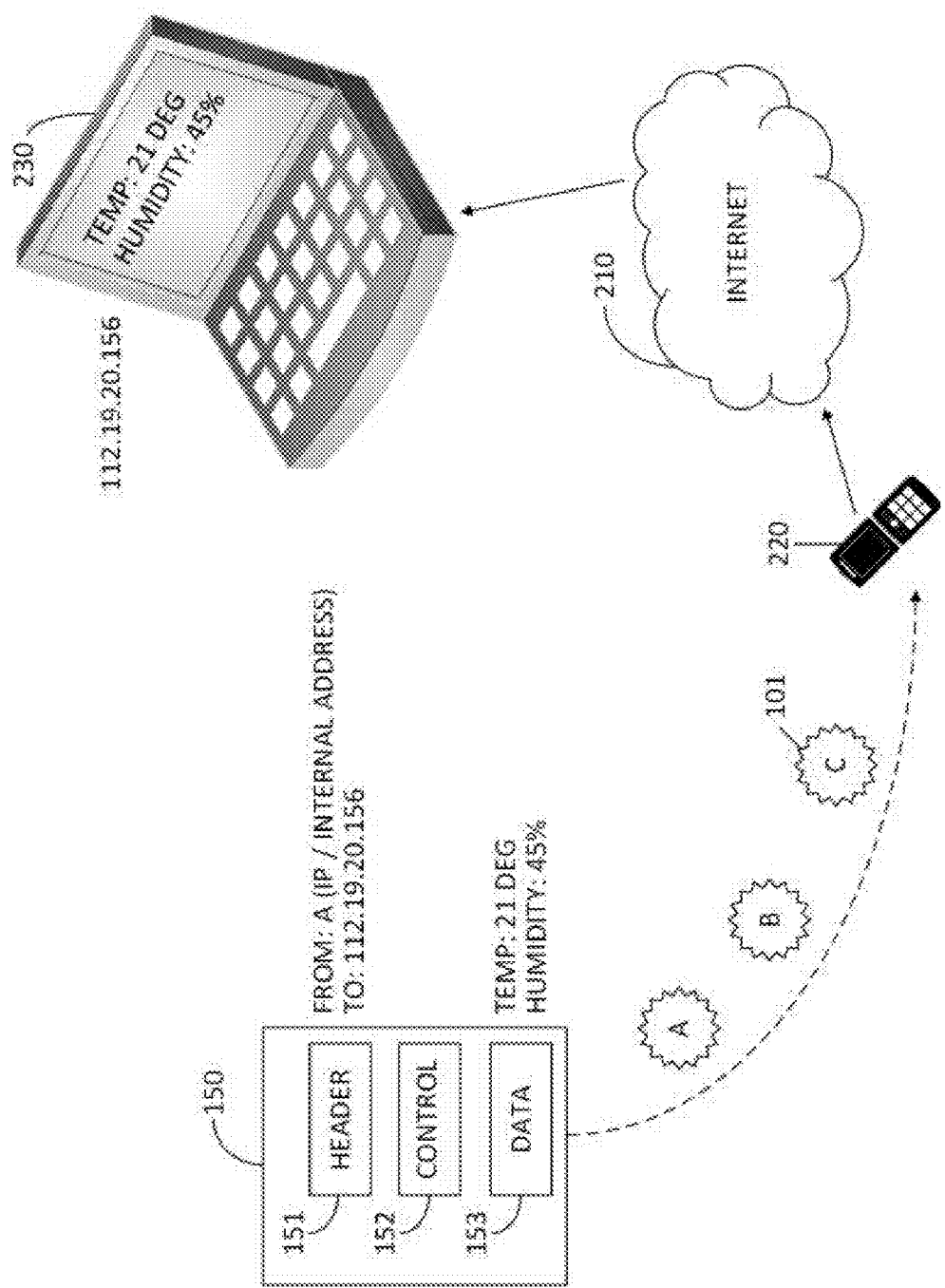
FIG. 10 is a simplified diagram of delivering a message via a network of stickers, in accordance with an embodiment of the present invention.

Reference is made to FIG. 10, which is a simplified diagram of delivering a message 150 via a network of stickers, in accordance with an embodiment of the present invention. FIG. 10 shows data message 150 with header section 151 indicating that the message is being sent from a source ID of sticker A to a destination computer having IP address 112.19.20.156. The ID of sticker A may be an IP address or an internal sticker network address. Control section 152 is empty, although for control messages, control section may include instructions; e.g., PRIORITY: MEDIUM, USE PUBLIC STICKER NETWORK. Data section 153 includes a temperature reading of 21 deg. and a humidity reading of 45%. This data represents the temperature and humidity in the current vicinity of sticker A.

Sticker A transmits message 150 to sticker B, when sticker B is within transmission range of sticker A. In turn, sticker B transmits message 150 to sticker C, when sticker C is within transmission range of sticker B. Sticker C is an enhanced sticker. As such, when Internet access point, such as cellphone 220, is within range of sticker C, then sticker C transmits message 150 to its destination computer 230 via Internet 210. FIG. 10 shows destination computer 230 successfully receiving message 150 and displaying the data content of the message. In turn, destination computer sends a control message to sticker C via Internet 210 acknowledging successful receipt of message 150, and possibly also an instruction based on the sticker's temperature and humidity readings.

Figure 11:
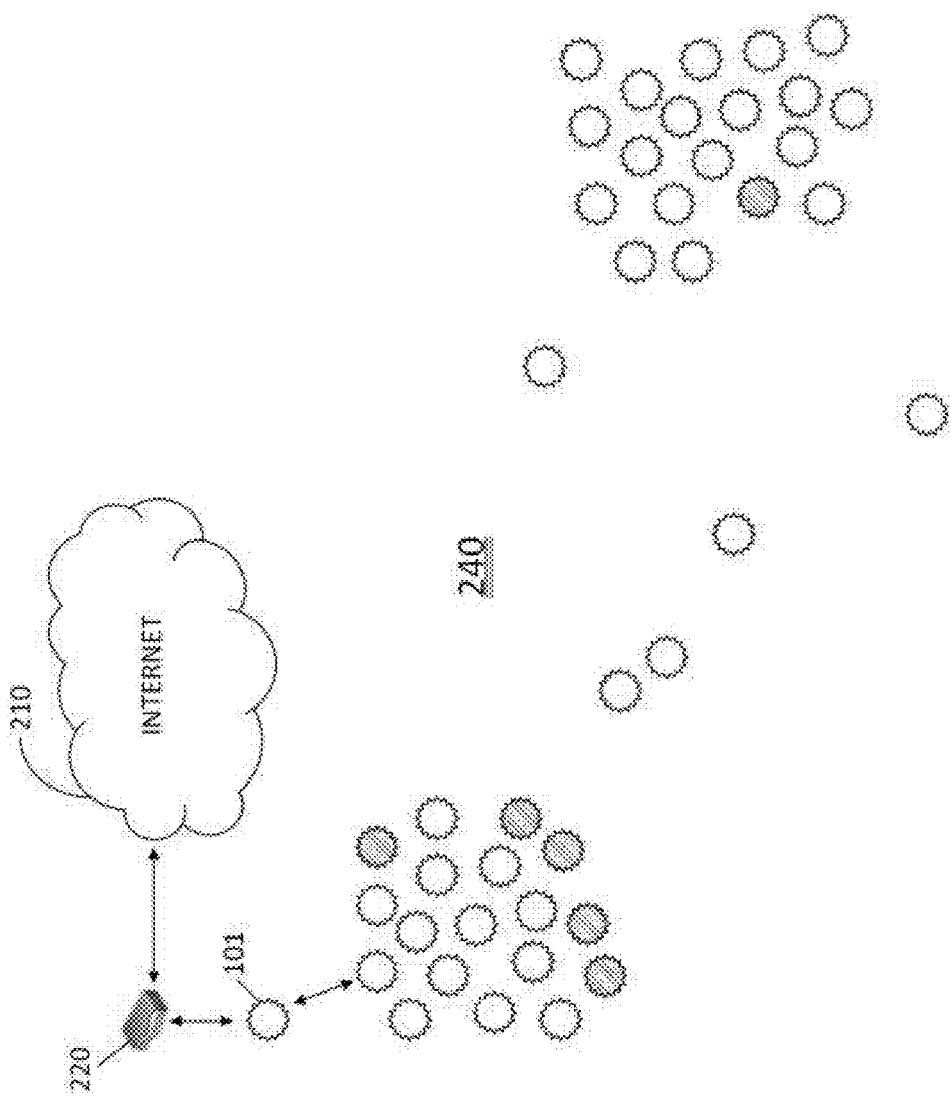
FIG. 11 is a simplified diagram of a world-wide network of stickers, in accordance with an embodiment of the present invention.

Reference is made to FIG. 11, which is a simplified diagram of a world-wide network 240 of stickers, in accordance with an embodiment of the present invention. FIG. 11 shows a plurality of stickers distributed in different geographical locations, an enhanced sticker 101, Internet 210 and an Internet access point 220, depicted as a router. When Internet access point 220 is within communication range of enhanced sticker 101, sticker 101 transmits its stored data messages to their destinations via Internet 210, and receives control messages from source computers via Internet 210. As shown in FIG. 11, many stickers may temporarily have no access to Internet 210.

Users may decide to join world-wide sticker network 240, or alternatively to use a private sticker network of their own. Stickers depicted in FIG. 9 with cross-hatching belong to a specific user, ABC Co. ABC Co. may use world-wide network 240, in which case each of ABC Co.'s stickers communicates with other stickers not belonging to ABC Co., but the data in its data messages is not exposed to the other stickers. Alternatively, ABC Co. may use its own private network of stickers.

Reference is made to FIG. 12, which is a simplified diagram of sticker management, in accordance with an embodiment of the present invention. FIG. 12 shows a sticker management application 250, a sticker user application 260, APIs 270 for sticker messages, sticker sensors and sticker drivers, and a database 280. Sticker management application 250 manages sticker-to-sticker world-wide network 240. Sticker user application 260 is, e.g., ABC Co.'s application for its stickers, which uses APIs 270 to control its stickers. APIs 270 operate in conjunction with APIs 131 (FIG. 2). APIs 270 enable user application 260 to add new properties, new sensors and new drivers. User application 260 controls data messages that the stickers generate, and control messages that send acknowledgements of received data messages, and that send instructions relating to the stickers' sensors and drivers, and internal configurations. Exemplary user application 260 operations are:

read sensor S from sticker A, send command C to driver D attached to sticker A, and set sticker A in power saving mode, inter alia by changing its sleep time period and/or its send and receive time intervals.

Database 280 stores inter alia messages, event logs, error logs and policies.

Figure 13:
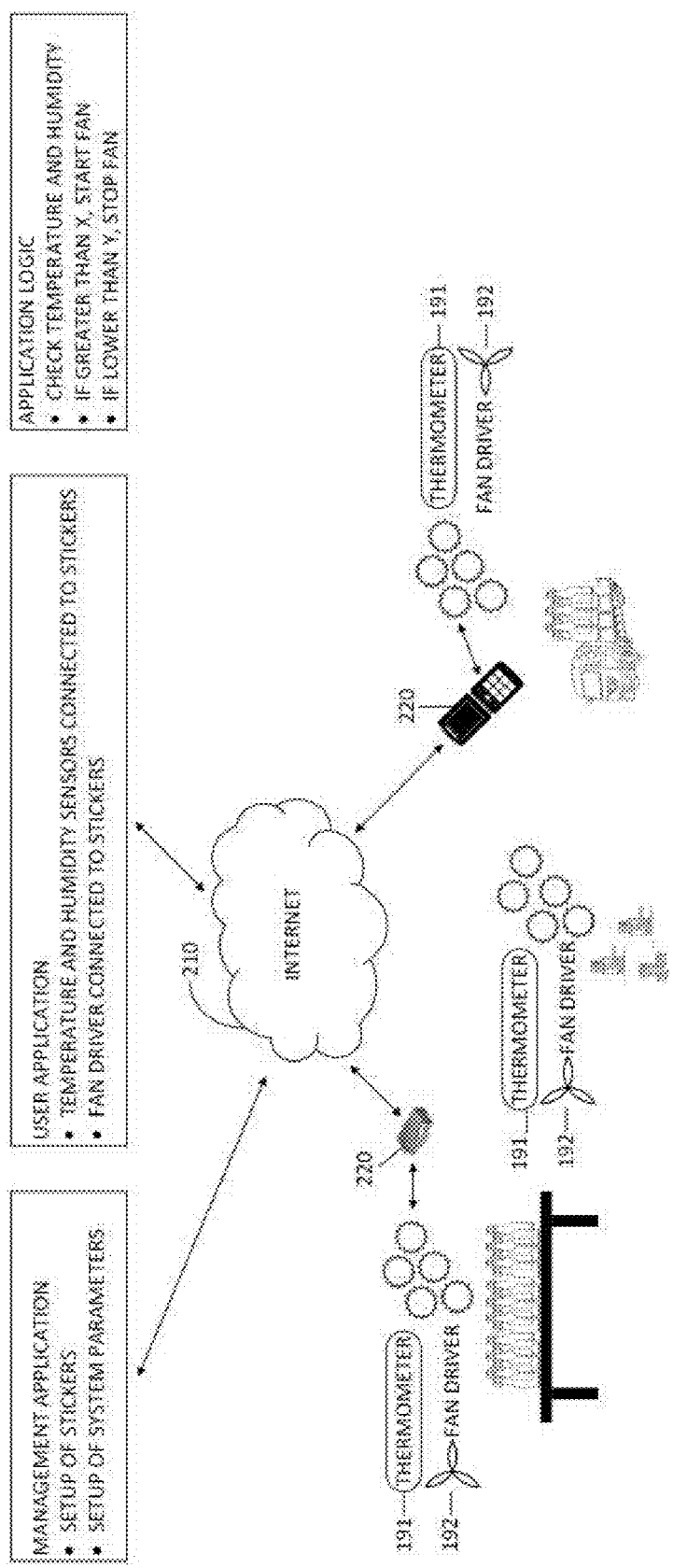
FIG. 13 is a simplified diagram of an exemplary sticker network application, in accordance with an embodiment of the present invention.

Reference is made to FIG. 13, which is a simplified diagram of an exemplary sticker network application, in accordance with an embodiment of the present invention. On the bottom right of FIG. 13 is shown a truck delivering bottles of medicine. Some or all of the medicine bottles have stickers attached thereto, at least one of is an enhanced sticker. The stickers include sensors, specifically a thermometer 191. The stickers have drivers 192 to operate a cooling fan. If a cellphone 220 is present in the delivery truck, then the stickers in the delivery truck use cellphone 220, via the enhanced sticker(s) in the truck, to transmit data messages to user application 260 (FIG. 10) and to receive control messages from user application 260 via Internet 210.

On the bottom left of FIG. 13 is shown a shelf in a pharmacy stocking the medicine bottles received from the delivery truck. If a local router, such as a Wi-Fi router 220, is present in the pharmacy, then the stickers on the shelf use router 220, via the enhanced sticker(s) on the shelf, to transmit data messages to user application 260 and to receive control messages from user application 260 via Internet 210.

As such, user application 260 receives temperature information from the stickers, to ascertain the temperature in the bottles' current vicinity. The stickers may include additional sensors, such as a humidity sensor, in which case user application 260 also ascertains the humidity in the current vicinity of the bottles; and a location sensor, in which case user application 260 also ascertains the current location of the bottles.

Based on the temperature and humidity in the current vicinity of the stickers, user application 260 may control the stickers to operate a fan coupled to the stickers via interface 190 (FIG. 1). E.g., logic of user application 260 may instruct the stickers to start the fan if the temperature/humidity in their vicinity is greater than a first threshold X, and to stop the fan if the temperature/humidity in their vicinity is lower than a second threshold Y.

User application 260 may generate a feedback loop for an air conditioner by instructing a driver to lower the air conditioner temperature when a sensor indicates that temperature of the bottles rose above a target temperature, and to raise the air conditioner temperature when a sensor indicates that temperature of the bottles fell below the target temperature.

The stickers shown in the bottom middle of FIG. 13 are currently in a location where there is no Internet access.

Multiple users may share the same sticker network. The delivery truck in FIG. 13 may deliver bottles of multiple companies simultaneously, and the pharmacy may stock bottles of the multiple companies simultaneously. Router 220 and cellphone 220 act as Internet access points for the multiple companies. Thus, stickers of ABC Co. communicate only with ABC Co.'s user application 260.

Figure 14:
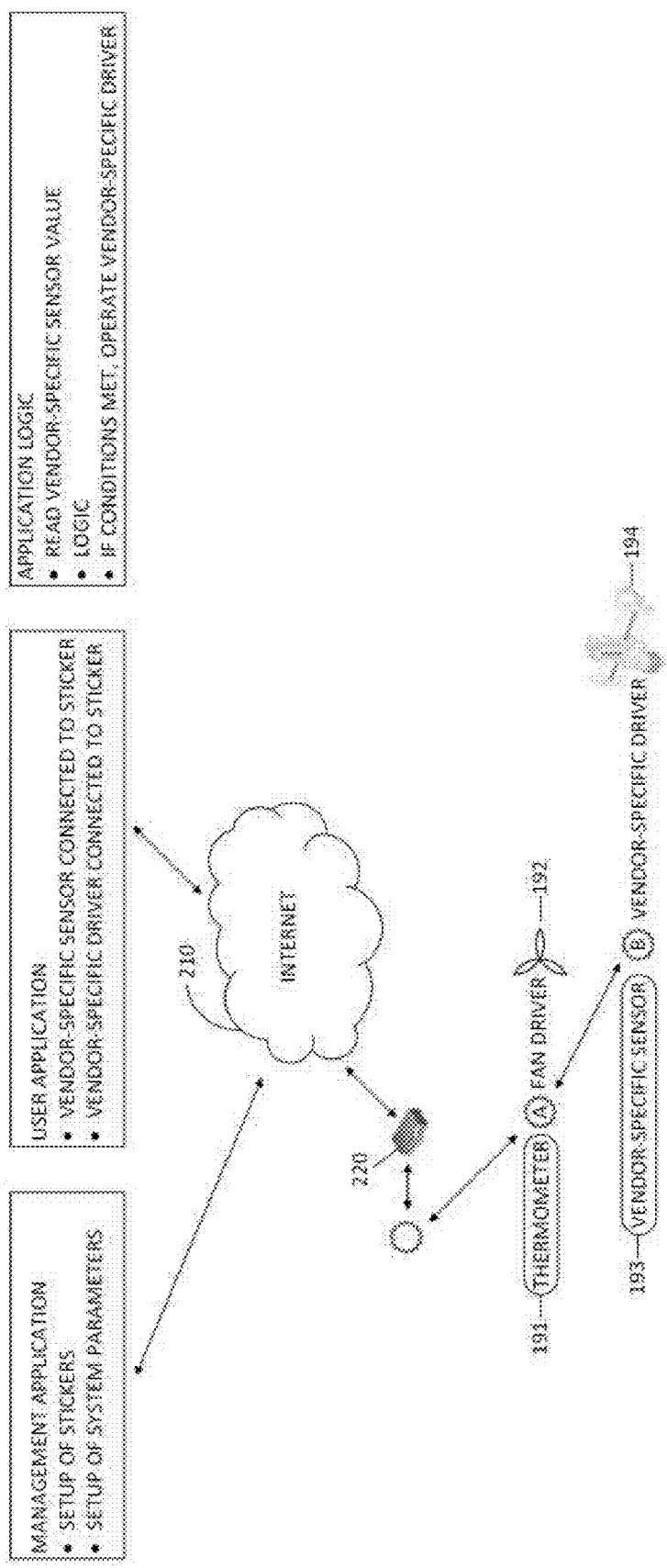
FIG. 14 is a simplified diagram of an exemplary sticker network application with vendor-specific sensors and drivers, in accordance with an embodiment of the present invention.

Reference is made to FIG. 14, which is a simplified diagram of an exemplary sticker network application with vendor-specific sensors and drivers, in accordance with an embodiment of the present invention. FIG. 14 shows a generic sticker A with a temperature sensor 191 and a fan driver 192. FIG. 14 also shows a vendor-specific sticker B having a vendor-specific sensor 193 and a vendor-specific driver 194. The vendor user application includes instruction for reading vendor-specific sensor 193, performing logic based on the sensor reading and, if specific conditions are met, then activating sensor-specific driver 194. It will be appreciated by those skilled in the art that use of vendor-specific sensors and drivers enables a vendor to customize control of its stickers.

Figure 15:
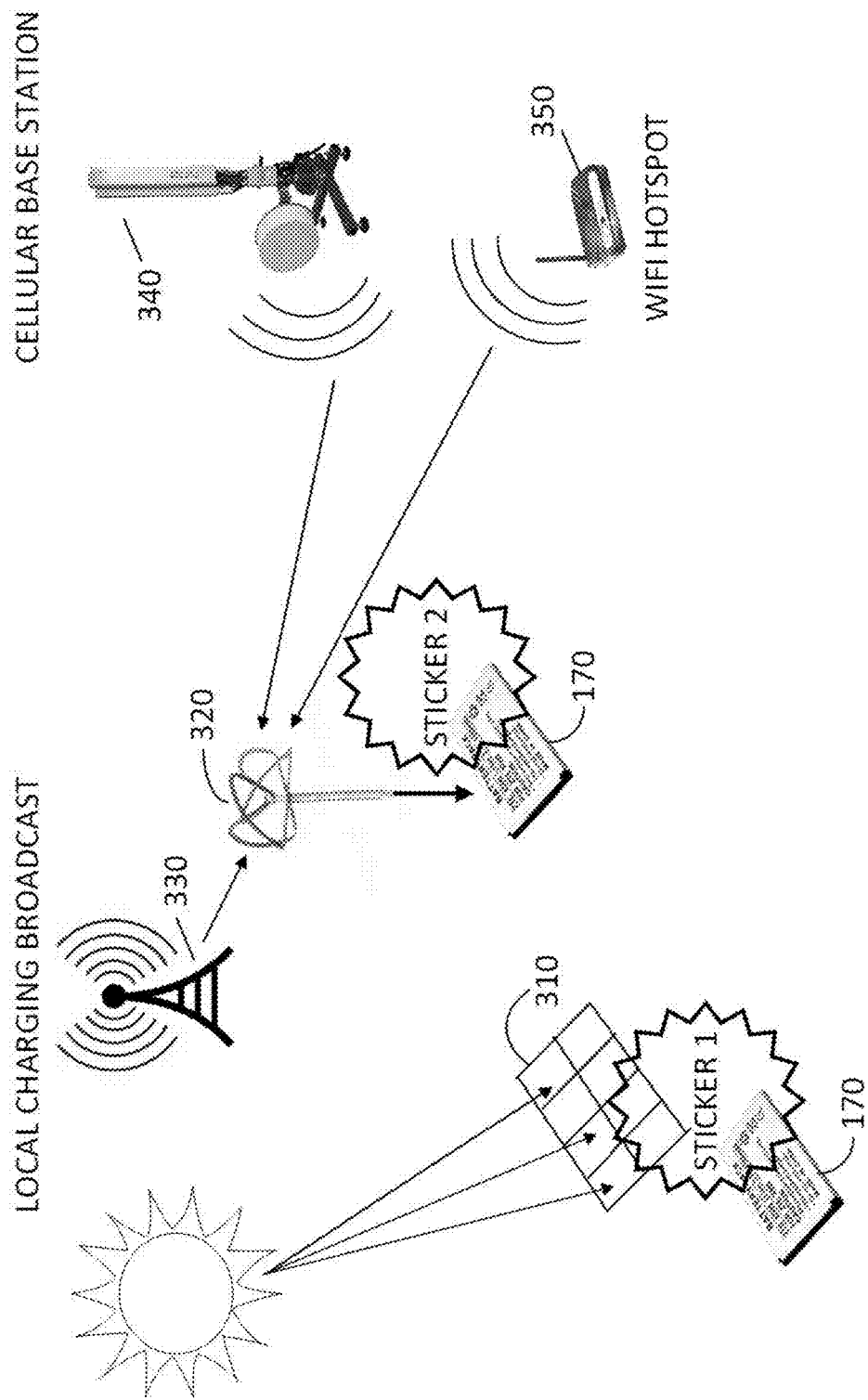
FIG. 15 is a simplified diagram of remote charging of stickers, in accordance with an embodiment of the present invention.

Reference is made to FIG. 15, which is a simplified diagram of remote charging of stickers, in accordance with an embodiment of the present invention. FIG. 15 shows two stickers 100, STICKER 1 and STICKER 2, each with a power source 170 that includes a rechargeable battery. Remote charging extends the operating time of stickers 100. FIG. 15 shows two general options for remote charging; namely, by solar energy and by converting radio frequency (RF) waves to power.

STICKER 1 includes a micro solar panel 310 on its surface. STICKER 1 intercepts sun energy and charges battery 170 by converting sun energy to power when the sunlight enters solar pane 310.

STICKER 2 includes a micro reception antenna 320, a convertor that converts RF waves to power, and a charger that connects to battery 170 via a regulator. As such, when STICKER 2 is located near local charging broadcast 330 then, while local charging broadcast 330 is transmitting, the energy of the transmitted RF waves is used to charge battery 170 of STICKER 2. More generally, local charging broadcast 330 broadcasts an RF signal to all stickers in its vicinity, and the batteries of those stickers are all charged.

Alternatively or additionally, a cellular base station 340 and/or a Wi-Fi hotspot 350 may be used to recharge battery 170 of STICKER 2. Generally, cellular base station 340 and Wi-Fi hotspot 350 are always transmitting RF waves. Upon reception by antenna 320 these RF waves are converted to power for battery 170.

Figure 16:
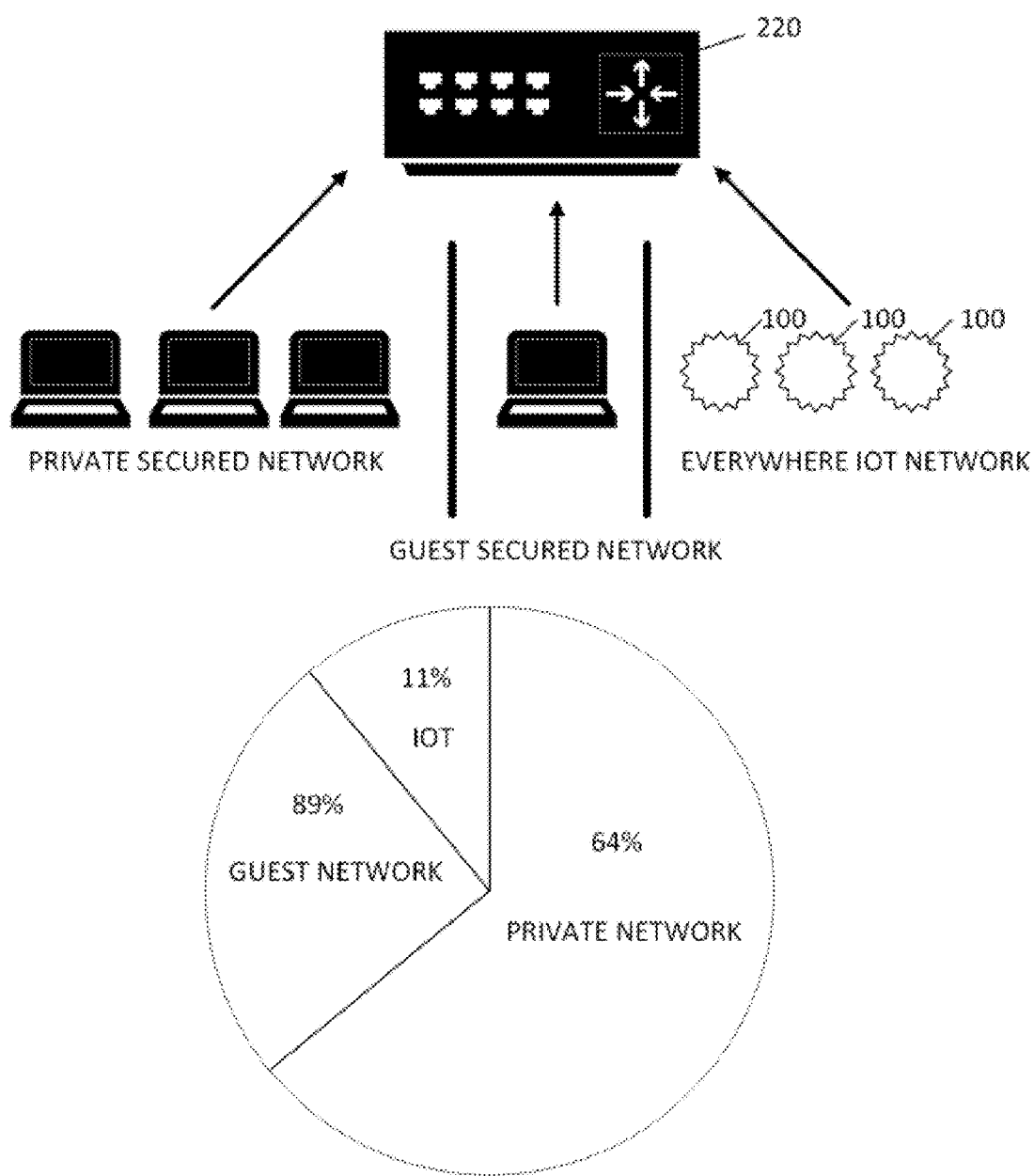
FIG. 16 is a simplified diagram of a protocol for stickers and other geographically distributed Internet of things (IoT) devices, in accordance with an embodiment of the present invention.

Reference is made to FIG. 16, which is a simplified diagram of a protocol for stickers and other geographically distributed Internet of Things (IoT) devices, in accordance with an embodiment of the present invention. FIG. 16 shows an Internet access point, namely, Wi-Fi router 220. A first portion of the traffic on router 220 is dedicated to a conventional private secured network. A second portion of the traffic on router 220 is dedicated to a convention guest secured network. A third portion of the traffic on router 220 is dedicated to stickers, or to other geographically distributed IoT devices.

FIG. 16 shows a pie chart for router 220, designating 64% of its traffic for a private network, 25% of its traffic for a guest network, and 11% of its traffic for the sticker/IoT network. The third portion of the traffic is non-conventional traffic for a router, and is effectively a donation for the benefit of the sticker/IoT network. As such, enhanced stickers are able to transmit data messages via the Internet and receive control messages via the Internet, by using the donated portions of routers and other Internet access points.

A sticker profile is a data structure incorporating

|Sticker ID|→|Item ID|→{list of attributes}, where {list of attributes} generally includes a list of one or more data entities of the form

[attribute name|attribute value|timestamp].

I.e., a sticker profile includes a Sticker ID, which is a unique worldwide sticker identifier, connected to a unique Item ID, which uniquely identifies the item to which the sticker is attached, and a list of attributes, each attribute including an attribute name and value, and an optional timestamp. Caching of sticker profiles provides a mechanism for preserving a time history of data messages, for such purposes inter alia as analysis, tracking, and improving performance. Caching enables saving sticker profiles until such time as the profiles are archived or erased.

In accordance with embodiments of the present invention, caching is performed at multiple levels. Optionally, each higher level of cache has a larger storage capacity. As such, when a sticker profile cache fills up, it transfers its cached data to a next-higher level cache. Caching also provides a mechanism for handling a situation where sticker storage 125 fills up with data messages 150, and a sticker does not have enough storage for newly generated and newly arriving data messages; in which case the sticker profiles are transferred to the next higher-level cache.

Figure 17:
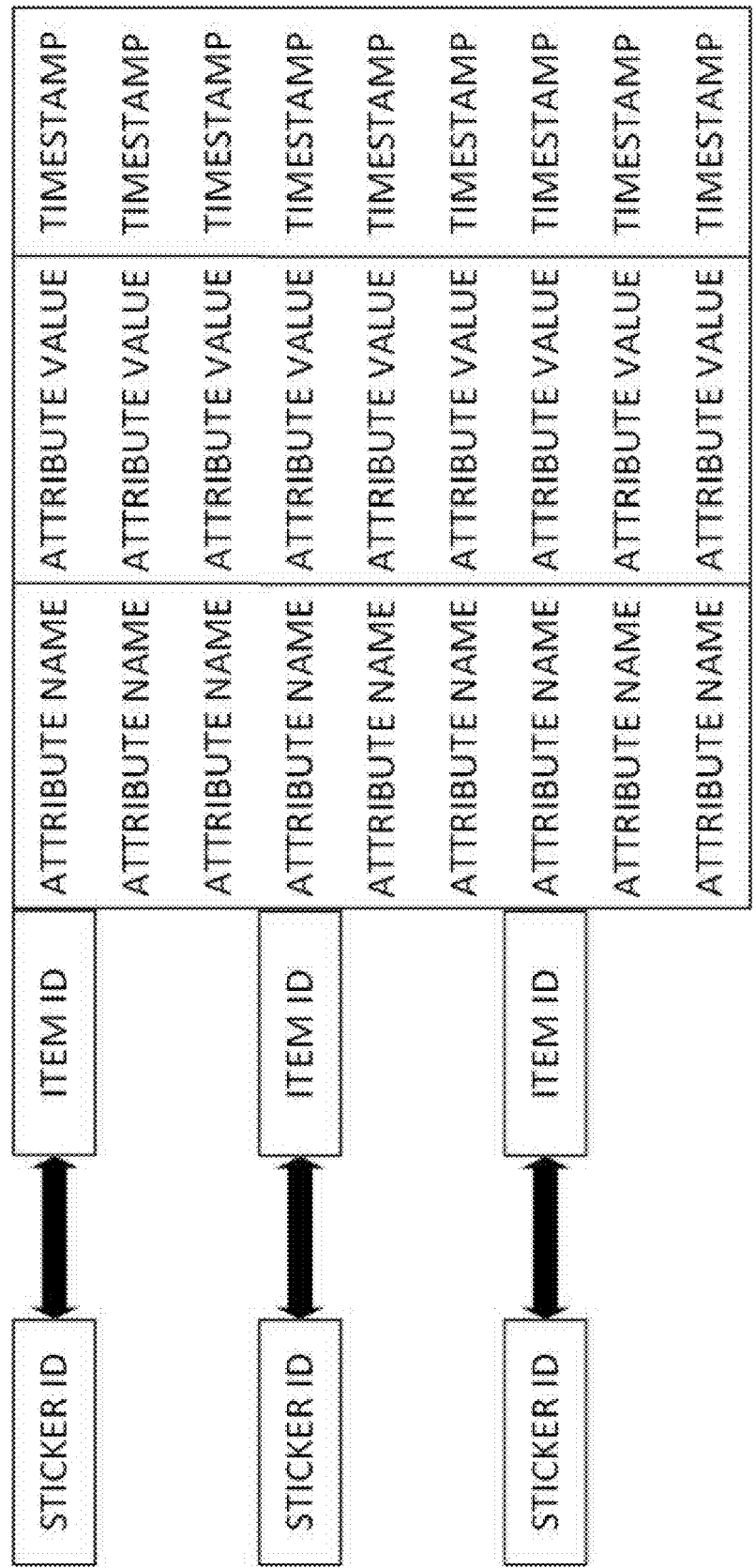
Figure 19:
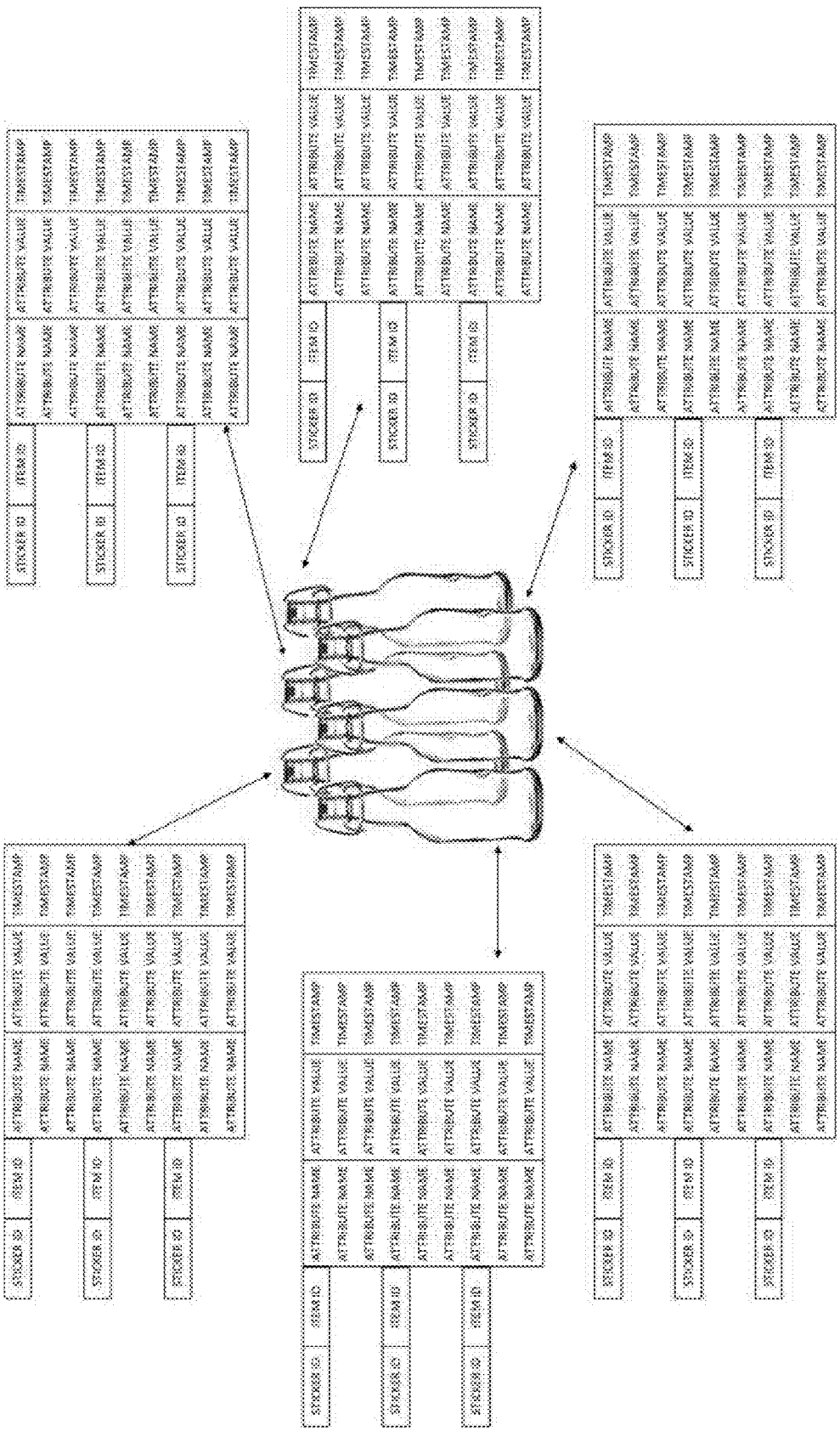

Reference is made to FIGS. 17-19, which are simplified drawings of sticker profiles and their bindings to items, in accordance with an embodiment of the present invention. The binding of the Sticker ID and the item ID is unique; i.e., a sticker is bound to a single specific item, and likewise an item is bound to a single specific sticker.

Sticker profiles are dynamic and change over time. E.g., sixty sticker profiles may be generated over a time period of one hour, each sticker profile generated during a different minute of time. For stickers attached to bottles, each minute that a sticker profile is created, the sensor attribute data is collected, as shown in TABLE II below.

TABLE II

| Sticker Profile | | |
| --- | --- | --- |
| ATTRIBUTE NAME | ATTRIBUTE VALUE | TIMESTAMP |
| Temperature | 87° F. | UTC 11:02:04 |
| Acceleration | 100 ft/m^2 | UTC 11:02:04 |

The collection of sixty sticker profiles indicates the story for this specific unique bottle; namely, temperature and acceleration every minute.

Sticker profiles may include any attributes, and any number of attributes may be attached to an item via a single sticker. Attributes need not be limited to data, and may include management and control attributes, which are used by the management system to send commands and controls to the sticker's operations.

Figure 20:
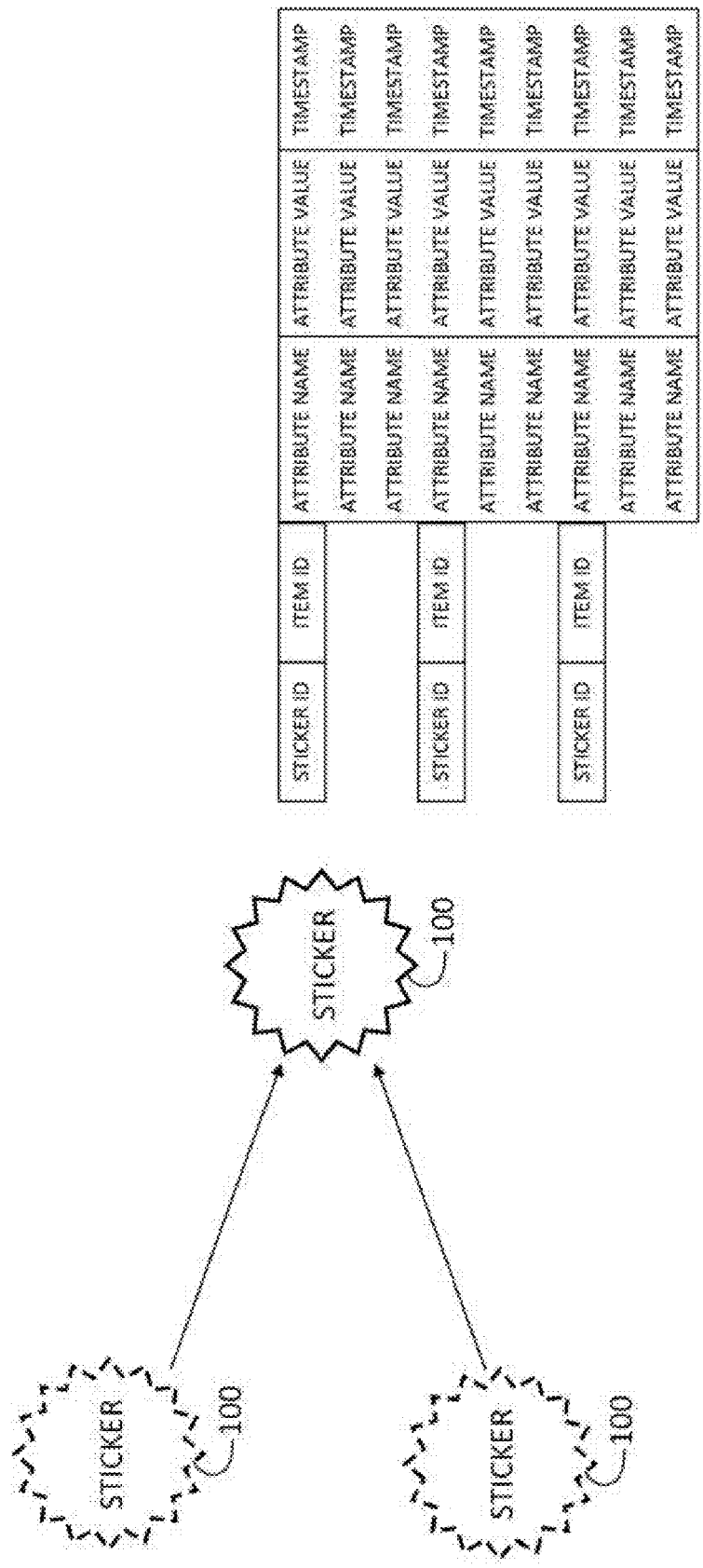
FIG. 20 is a simplified diagram of a first level of caching, whereby sticker profiles are cached within the sticker themselves, in accordance with an embodiment of the present invention.

Sticker profiles are cached at various levels. Reference is made to FIG. 20, which is a simplified diagram of a first level of caching, whereby sticker profiles are cached within stickers 100 themselves, in accordance with an embodiment of the present invention. Since each sticker receives data from other nearby stickers, each sticker caches its data locally in order to be able to transmit the cached data subsequently.

Figure 21:
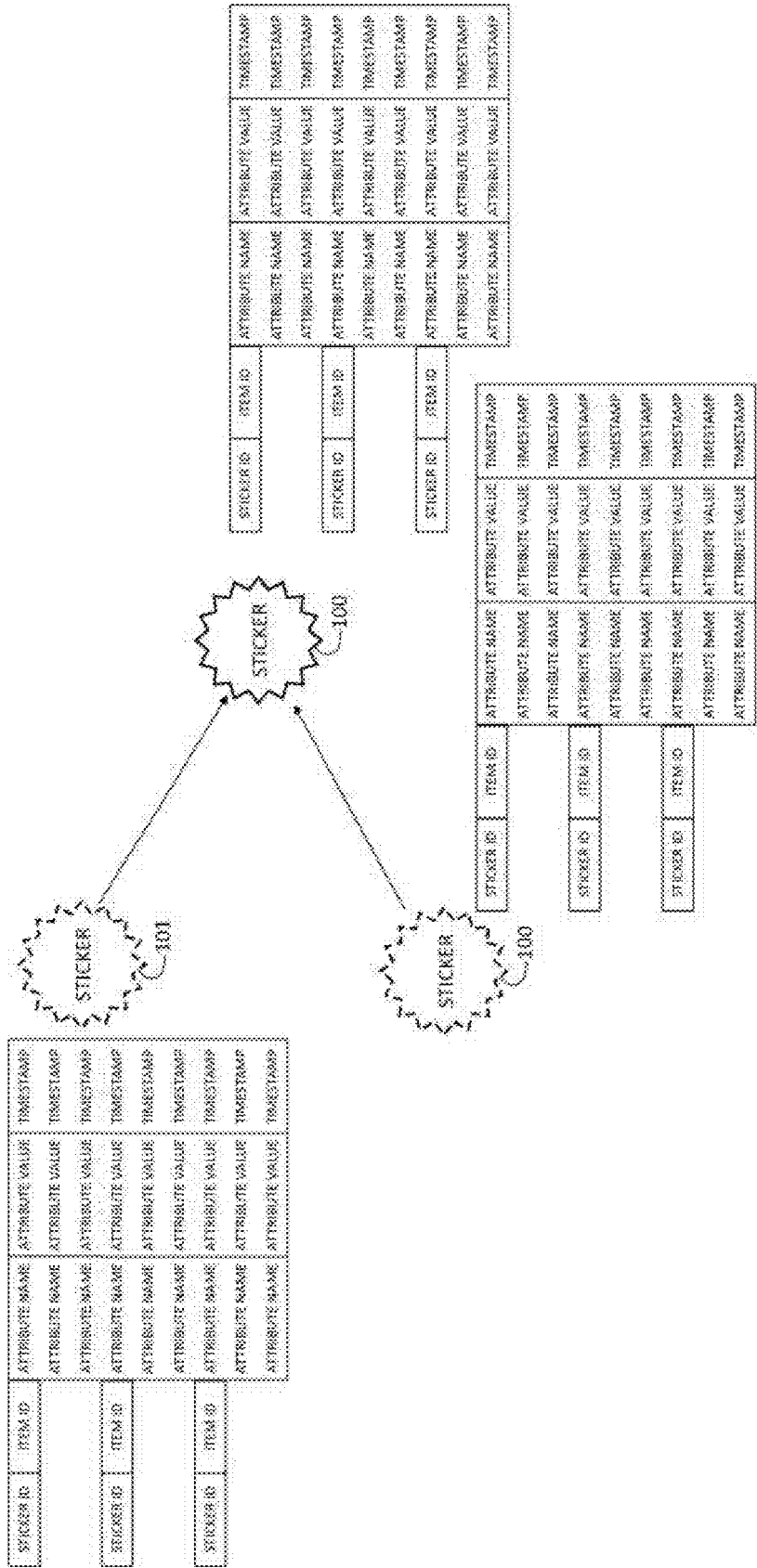
FIG. 21 is a simplified diagram of a second level of caching, whereby sticker profiles are cached within enhanced stickers, which act as gateways for groups of stickers, in accordance with an embodiment of the present invention.

Reference is made to FIG. 21, which is a simplified diagram of a second level of caching, whereby sticker profiles are cached within enhanced stickers 101, which act as gateways for groups of stickers, in accordance with an embodiment of the present invention. Each enhanced sticker 101 caches the sticker profiles accumulated from stickers 100 in its vicinity, and forwards the profiles to a cloud entity via the Internet.

Figure 22:
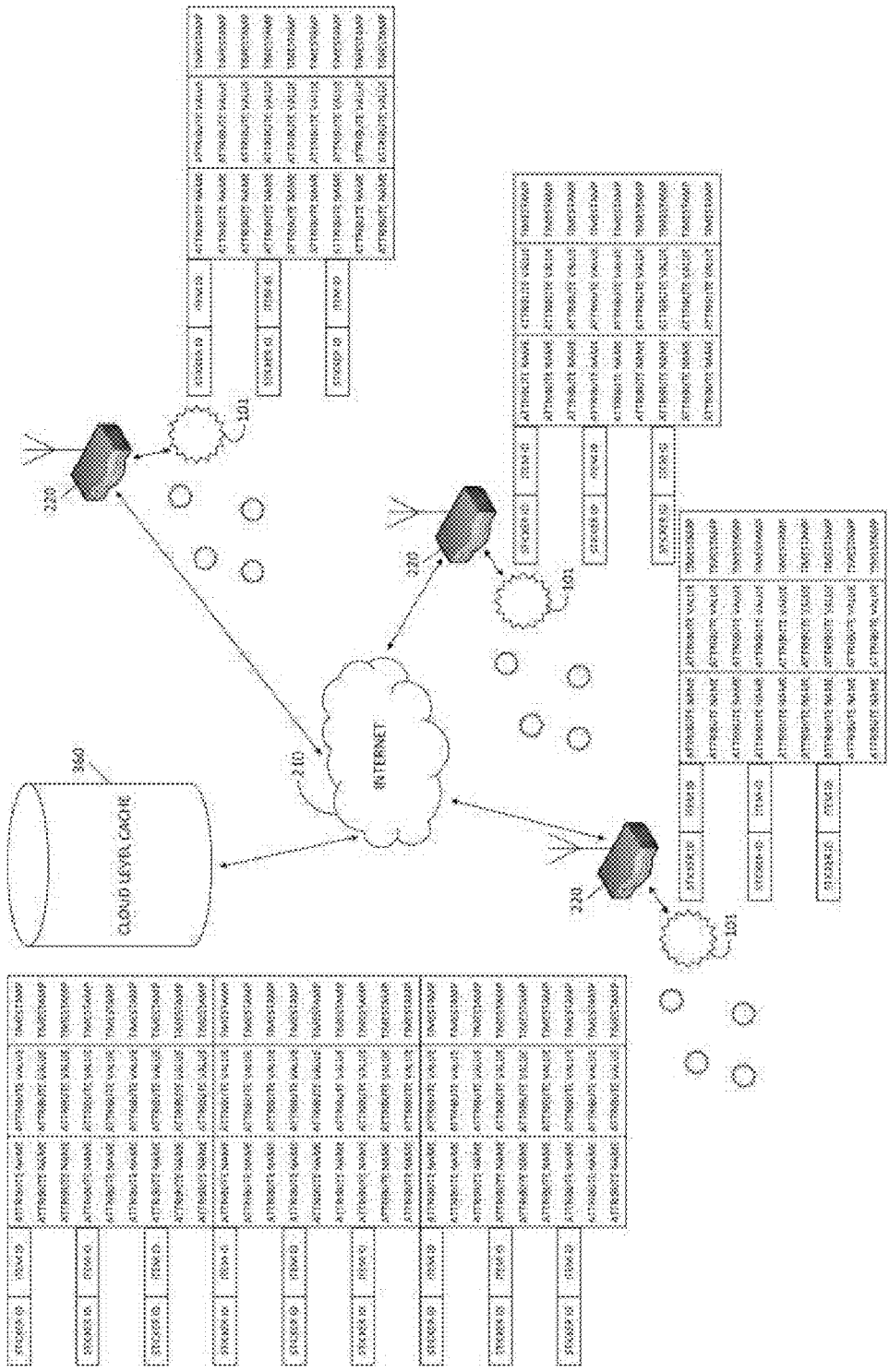
FIGS. 22 and 23 are simplified diagrams of a third level of caching, whereby a cloud entity caches sticker profiles for one or more gateways in a cloud level cache, thereby serving as an area cache, in accordance with an embodiment of the present invention.
Figure 23:
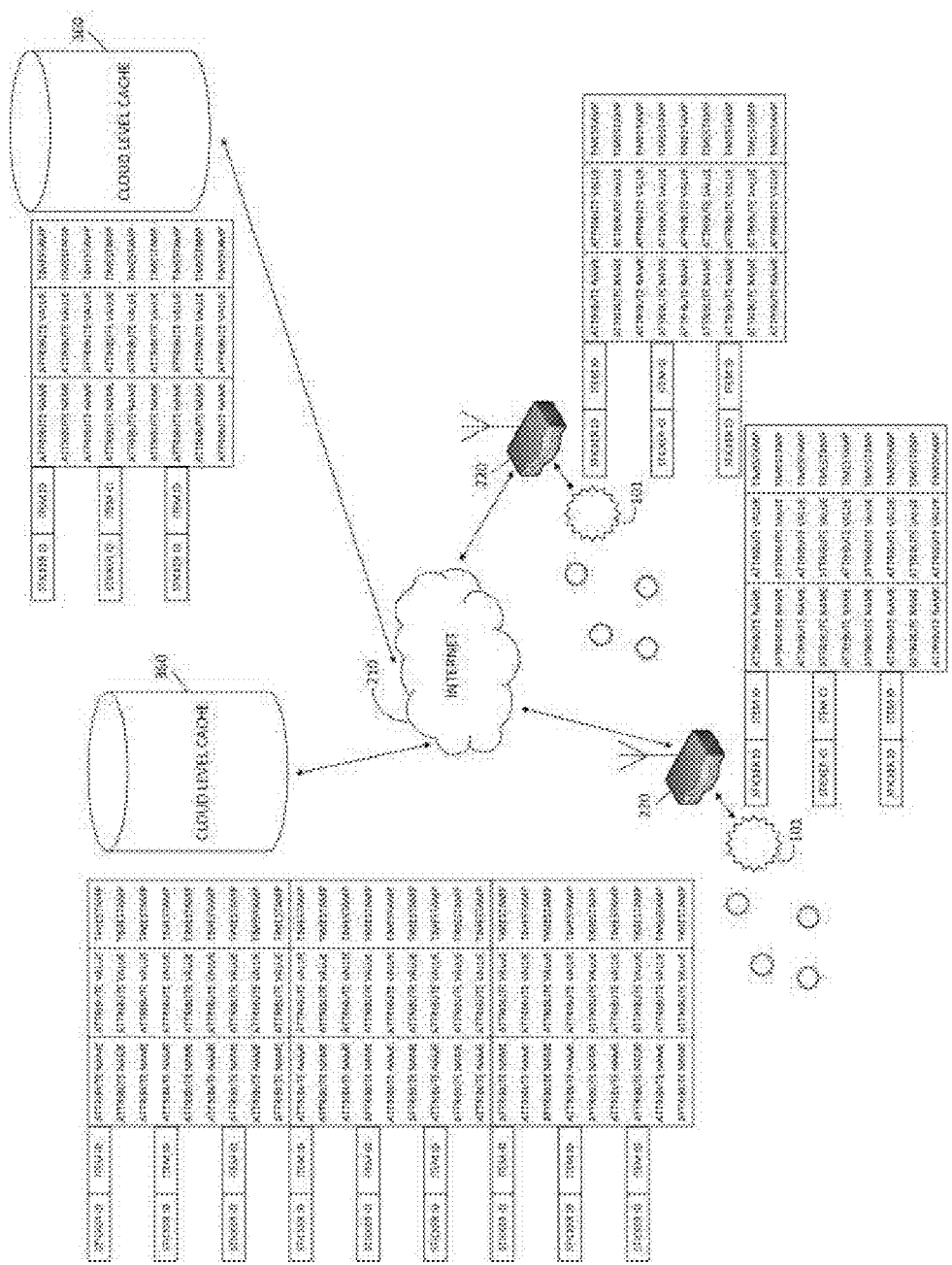

Reference is made to FIGS. 22 and 23, which are simplified diagrams of a third level of caching, whereby a cloud entity caches sticker profiles for one or more gateways in a cloud level cache 360, thereby serving as an area cache, in accordance with an embodiment of the present invention. In accordance with some embodiments of the present invention, there are multiple cloud levels, each higher level accumulates caches of the previous level.

Figure 24:
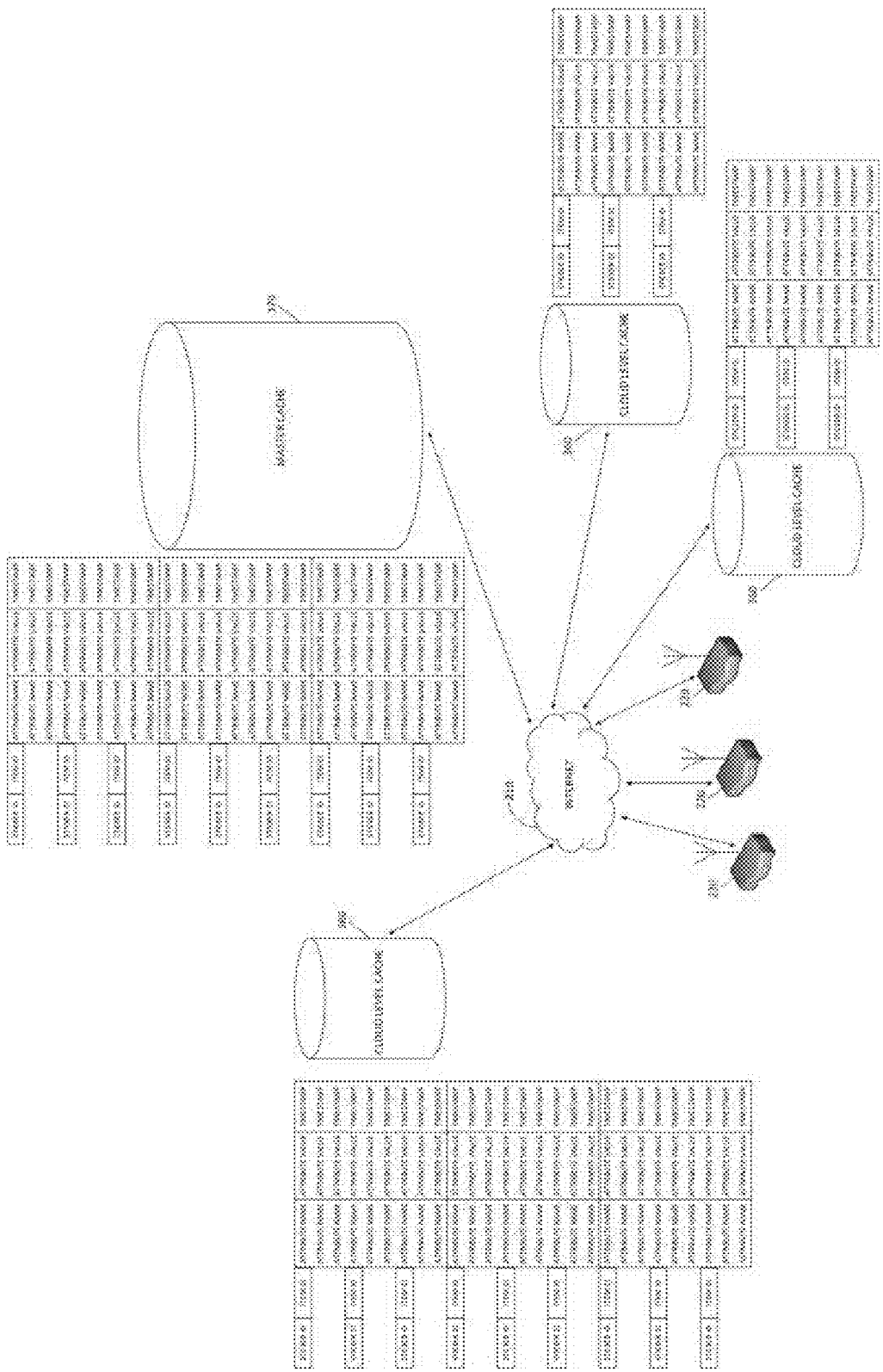
FIG. 24 is a simplified diagram of a fourth level of caching, whereby the totality of all caches may be cached in a master cache 370, in accordance with an embodiment of the present invention.

Reference is made to FIG. 24, which is a simplified diagram of a fourth level of caching, whereby the totality of all caches may be cached in a master cache 370, in accordance with an embodiment of the present invention. Master cache 370 may be centralized or distributed. In a centralized topology, a master cloud entity serves as master cache 370—caching all caches, and thus representing all sticker profiles at all times. In a distributed topology, each cloud cache stores a portion of the master cache, and together the cloud caches encompass the entire master cache 370 of sticker profiles.

The owner of a specific sticker network uses an application, inter alia a management application, to query the caches. The query may be, for example, to retrieve all cache information for a specific sticker or group of stickers over a designated time period.

A sticker profile may reach the end of its life and be moved to an archive, or to such other location for history tracking.

Figure 25:
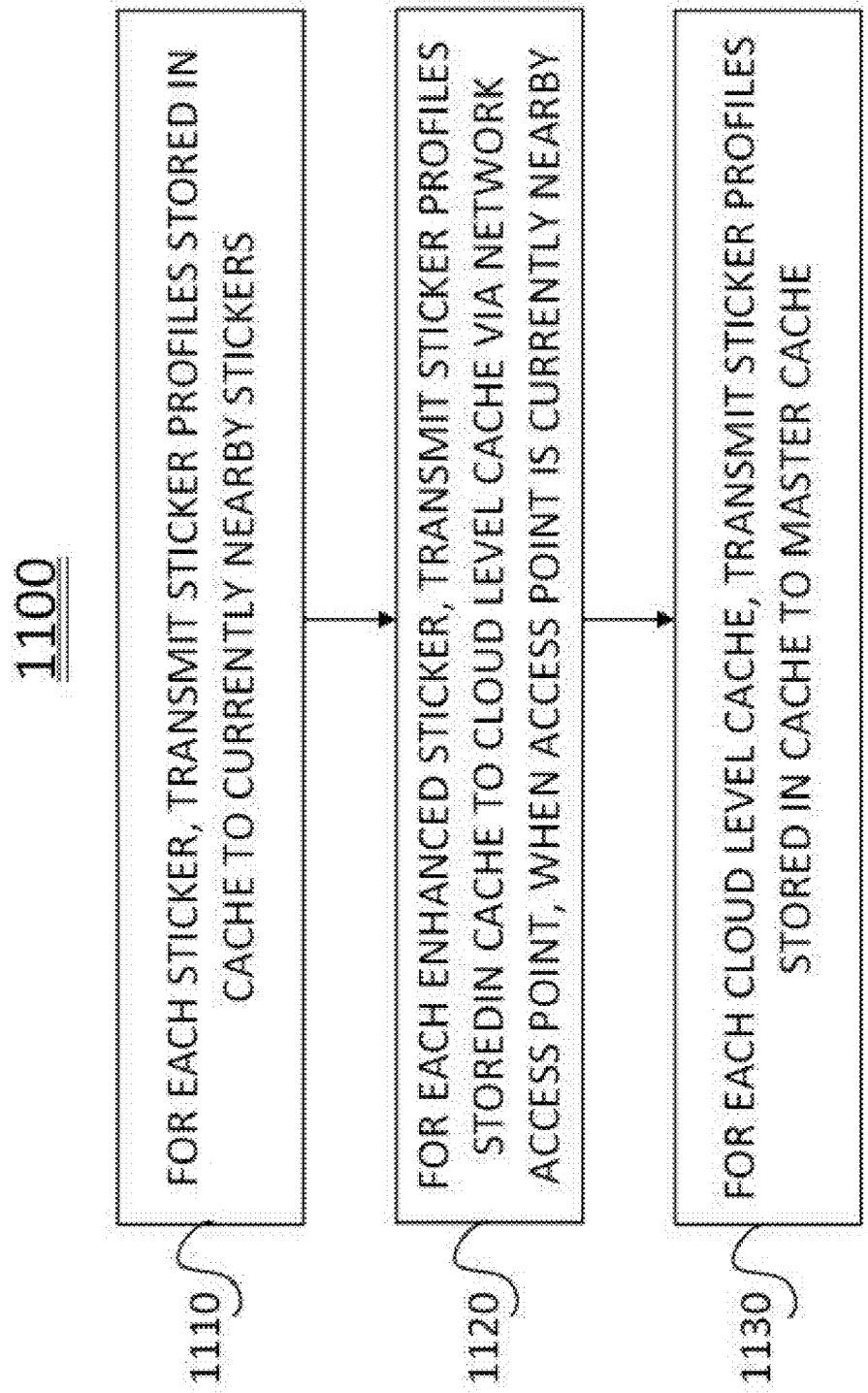
FIG. 25 is a simplified flowchart of a method 1100 for multi-level caching of sticker profiles, in accordance with an embodiment of the present invention For reference to the figures, TABLE I below lists elements and their numerals. Similarly numbered elements represent elements of the same type, but they need not be identical elements. Elements in the figures numbered in the 1000's are operations of flow charts.

Reference is made to FIG. 25, which is a simplified flowchart of a method 1100 for multi-level caching of sticker profiles, in accordance with an embodiment of the present invention. Operation 1110 is performed by each sticker. At operation 1110, a sticker 100 transmits, using its wireless communicator, the sticker profiles stored in its cache to nearby stickers. Operation 1120 is performed by each enhanced sticker. At operation 1120, an enhanced sticker 101 transmits, using its wireless communicator, the sticker profiles stored in its cache to a cloud level cache, via an access point to the sticker network that is nearby the enhanced sticker. Operation 1130 is performed by each cloud level cache. At operation 1130, a cloud-level cache 360. At operation 1130, a cloud level cache transmits the sticker profiles stored in its cache to master cache 370.

It will thus be appreciated that embodiments of the subject invention enable a world-wide network and a private network of stickers that implement protocols of sticker-to-sticker and sticker-to-Internet communication. Embodiments of the subject invention enable efficient quality control, including environmental and defect control, for items of goods that are moved about. These embodiments make it possible advantageously (i) to avoid spoilage of goods due to environmental conditions, (ii) to recall before use items of goods that are defective, (iii) to identify shortcoming in the ways goods are transported and delivered, (iv) to manage inventory, and (v) to implement vendor-specific functions, such as reading vendor-specific parameters, and activating vendor-specific drivers in response to the parameter readings.

It will further be appreciated that the subject invention has widespread application to communication with and among inexpensive, possible disposable, IoT devices whose locations are geographically distributed.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A sticker communication system with multi-level caching and multi-directional communication, comprising:
   a plurality of stickers, each sticker having a unique ID, each sticker attachable to an item of goods having a unique ID, and each sticker comprising:
   a processor;
   a cache communicatively coupled with said processor, caching sticker profiles for a plurality of stickers, wherein a sticker profile comprises a sticker ID, an ID for an item of goods to which the sticker is attached, and a history of data entities in the form of [attribute name|attribute value|timestamp]; and
   a wireless communicator coupled with said processor and said storage, wirelessly transmitting and receiving sticker profiles, wherein said processor is configured to transmit sticker profiles stored in said cache via said wireless communicator to currently nearby stickers that are within range of said wireless communicator, to receive sticker profiles from the nearby stickers, and to store the received sticker profiles in said cache, whereby the protocol for message communication between the sticker and other stickers is a protocol without awareness of locations of other stickers, and with random data message exchange.

2. The communication system of claim 1, wherein some of said stickers are enhanced stickers, each enhanced sticker having the capability to forward its cached sticker profiles to a cloud cache via an access point for a network, when the access point is currently within range of the enhanced sticker's wireless communicator.

3. The communication system of claim 1 further comprising one or more cloud level caches, wherein some of said stickers are enhanced stickers, each enhanced sticker having the capability to forward its cached sticker profiles to a cloud level cache, via an access point for a network, when the access point is currently within range of the enhanced sticker's wireless communicator.

4. The communication system of claim 3 wherein each enhanced sticker has a larger cache than that of non-enhanced stickers, thus being able to cache a larger number of sticker profiles than a non-enhanced sticker.

5. The communication system of claim 3 wherein each cloud level cache has a larger cache than that of enhanced stickers, thus being able to cache a larger number of sticker profiles than an enhanced sticker.

6. The communication system sticker of claim 3 further comprising a master cache that receives cached sticker profiles from cloud level caches, wherein the master cache has a larger cache than that of the cloud level caches, thus being able to cache a larger number of sticker profiles than a cloud level cache.

7. A method for multi-level caching for use in a sticker communication system, the method comprising:
   for each one of a plurality of stickers, each sticker having a unique ID and including a cache storing sticker profiles and including a wireless communicator transmitting and receiving sticker profiles, transmitting sticker profiles cached within the sticker's cache to other stickers that are currently nearby to the sticker, within range of the sticker's wireless communicator, wherein a sticker profile includes a unique sticker ID, a unique ID for an item of goods to which the sticker is attached, and a history of data entities in the form of [attribute name|attribute value|timestamp], and
   wherein the protocol for message communication is a protocol without awareness of locations of stickers, and with random data message exchange;
   for each one of the plurality of stickers which is an enhanced sticker, transmitting sticker profiles cached within the sticker's cache to a cloud level cache via an access point for a network, when the access point is currently within range of the enhanced sticker's wireless communicator; and
   for each cloud level cache, transmitting sticker profiles cached within the cloud level cache to a master cache, wherein the master cache has a larger cache than that of the cloud level caches, thus being able to cache a larger number of sticker profiles than a cloud-level cache.

8. The method of claim 7 wherein each enhanced sticker has a larger cache than that of non-enhanced stickers, thus being able to cache a larger number of sticker profiles than a non-enhanced sticker.

9. The method of claim 7 wherein each cloud level cache has a larger cache than that of enhanced stickers, thus being able to cache a larger number of sticker profiles than an enhanced sticker.

* * * * *